(12) United States Patent
Courtois et al.

(10) Patent No.: US 8,375,995 B2
(45) Date of Patent: Feb. 19, 2013

(54) DEVICE FOR PROTECTING A MALE END OF A THREADED TUBULAR CONNECTION COMPONENT, HAVING OPEN AND CLOSED POSITIONS, AND ASSOCIATED METHODS AND MOUNTING MACHINES

(75) Inventors: Sebastien Courtois, Lavancia-Epercy (FR); Stephane Morel, Les Moussieres (FR); Erwan Cadiou, Quimper (FR); Roque Velasquez, Veracruz (MX)

(73) Assignees: Vallourec & Mannesmann Oil & Gas France, Aulnoye-Aymeries (FR); Vam Mexico SA de CV, Veracruz (MX)

( * ) Notice: Subject to any disclaimer, the term of this patent is extended or adjusted under 35 U.S.C. 154(b) by 753 days.

(21) Appl. No.: 12/519,434

(22) PCT Filed: Dec. 14, 2007

(86) PCT No.: PCT/FR2007/002076
§ 371 (c)(1),
(2), (4) Date: Aug. 11, 2009

(87) PCT Pub. No.: WO2008/087302
PCT Pub. Date: Jul. 24, 2008

(65) Prior Publication Data
US 2010/0089484 A1    Apr. 15, 2010

(30) Foreign Application Priority Data
Dec. 19, 2006 (FR) ..................... 06 11065

(51) Int. Cl.
*F16L 57/00* (2006.01)
(52) U.S. Cl. .................. 138/96 T; 138/96 R

(58) Field of Classification Search ............ 138/96 R, 138/96 T
See application file for complete search history.

(56) References Cited

U.S. PATENT DOCUMENTS

| 1,000,375 A | * | 8/1911 | Cable | 138/96 T |
| 1,756,167 A | * | 4/1930 | Avery | 138/96 T |
| 1,839,448 A | * | 1/1932 | Stresau | 138/96 T |

(Continued)

FOREIGN PATENT DOCUMENTS
| GB | 2 177 774 | 1/1987 |
| WO | 01 14686 | 3/2001 |

OTHER PUBLICATIONS

U.S. Appl. No. 12/527,480, filed Aug. 17, 2009, Courtois, et al.

*Primary Examiner* — James Hook
(74) *Attorney, Agent, or Firm* — Oblon, Spivak, McClelland, Maier & Neustadt, L.L.P.

(57) ABSTRACT

A protective device for a male end of a component of a threaded tubular connection for drilling and working hydrocarbon wells is externally provided with at least one threading and includes a free terminal portion. The device includes i) a protector body produced in the form of a first sleeve and arranged to protect at least a portion of the external threading and the free terminal portion, ii) a sealing element for positioning in contact firstly with the component, at least at a portion located downstream of the external threading of the male end, and secondly with the protector body to provide a first seal downstream of the external threading, and iii) a fixing mechanism displacing the sealing element and/or protector body radially towards the component, defining open and closed positions of the device in which the sealing element and/or the protector body are respectively not in contact and in tight contact with the component. Further, the first seal is obtained in the closed position of the device.

8 Claims, 13 Drawing Sheets

U.S. PATENT DOCUMENTS

Figure 1A:
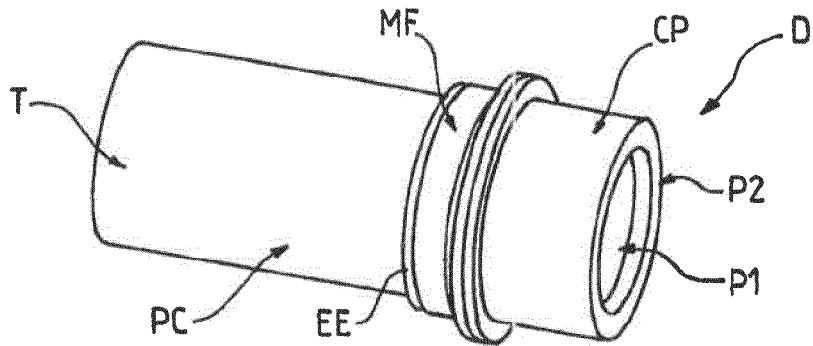

| | | | |
|---|---|---|---|
| 1,931,703 A * | 10/1933 | McCrery | 138/96 T |
| 2,061,366 A * | 11/1936 | Mazurie | 138/96 R |
| 2,159,929 A * | 5/1939 | Kahn et al. | 138/96 T |
| 2,212,423 A | 8/1940 | Lytle | |
| 2,523,930 A * | 9/1950 | Unke | 138/96 T |
| 4,020,873 A * | 5/1977 | Palarino | 138/96 T |
| 4,157,100 A | 6/1979 | Turk | |
| 4,379,471 A * | 4/1983 | Kuenzel | 138/89 |
| 4,487,228 A * | 12/1984 | Waldo et al. | 138/96 T |
| 5,452,749 A | 9/1995 | Johnson et al. | |
| 5,469,679 A | 11/1995 | Burkard et al. | |
| 2005/0081933 A1* | 4/2005 | Latiolais et al. | 138/96 T |

* cited by examiner

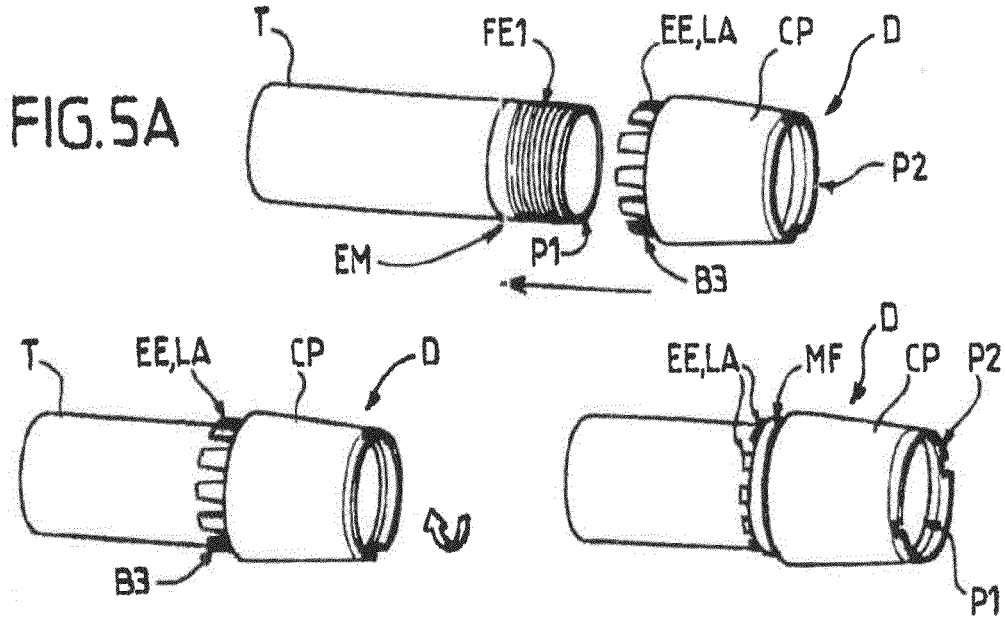
FIG.5A
FIG.5B
FIG.5C
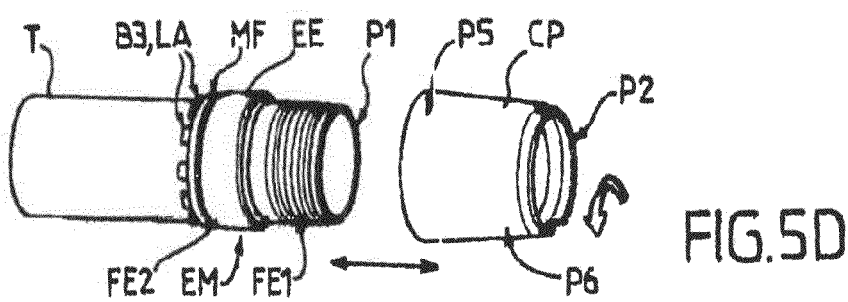
FIG.5D
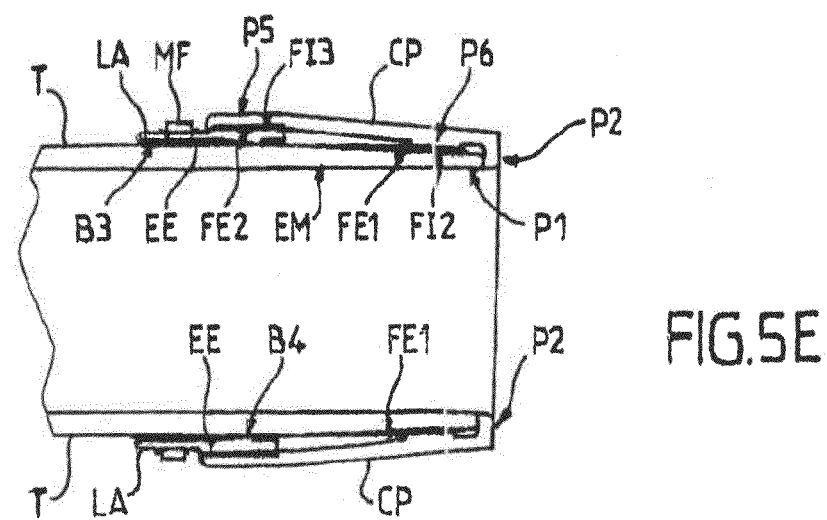
FIG.5E

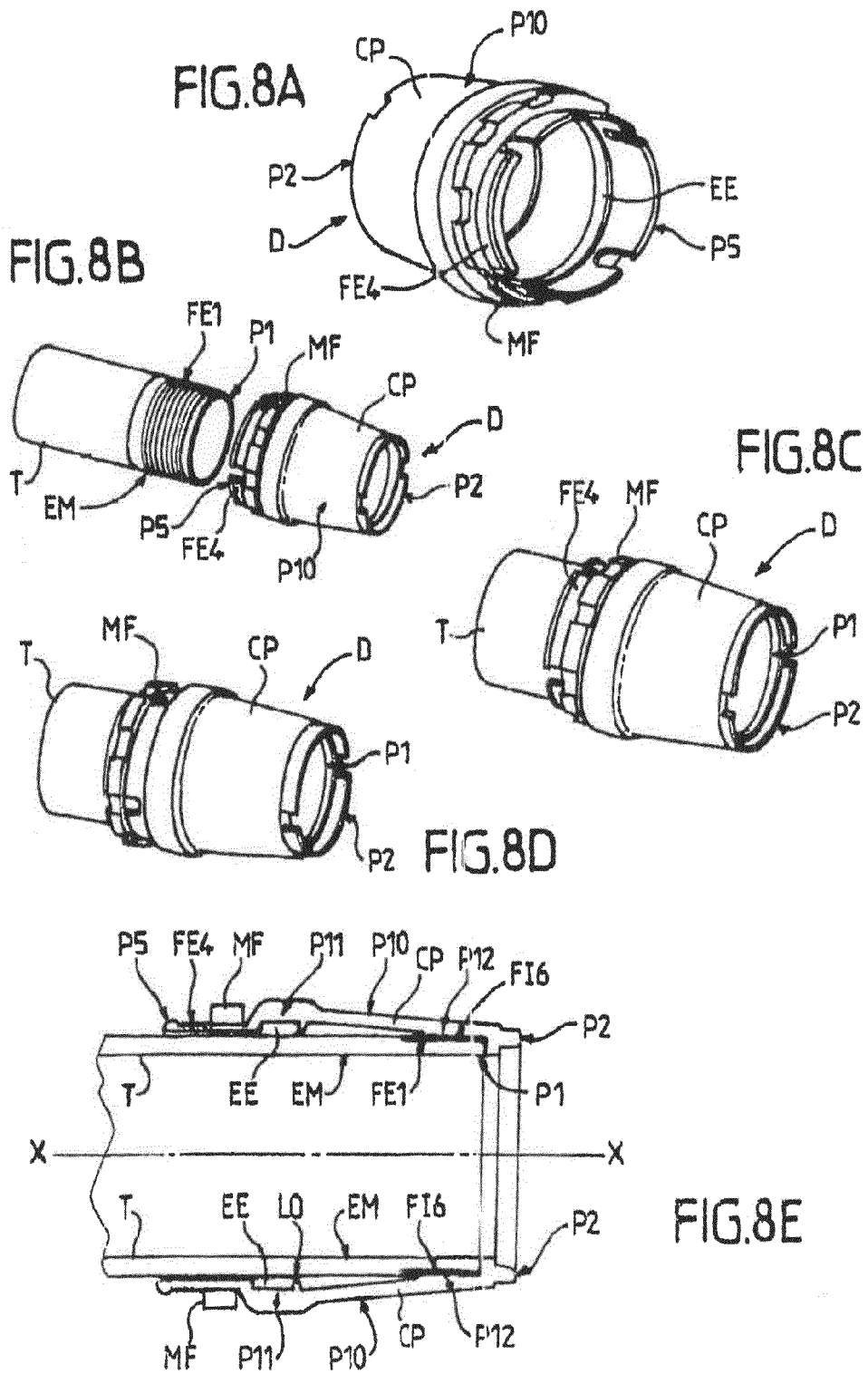

DEVICE FOR PROTECTING A MALE END OF A THREADED TUBULAR CONNECTION COMPONENT, HAVING OPEN AND CLOSED POSITIONS, AND ASSOCIATED METHODS AND MOUNTING MACHINES

The invention relates to components of threaded tubular connections used, for example, in oil applications, and more precisely to protecting the male end of certain of these components.

The term "component" as used here means any element or accessory used to drill or work a well and intended for connection via a threading to another component to constitute a threaded tubular connection with that other component. The component may, for example, be a relatively great-length tube (in particular about ten metres long), a tubular coupling several tens of centimeters long, or an accessory for said tubes (a hanger, a cross-over, a safety valve, a tool joint, a sub or the like).

The components are generally assembled together to be dropped into a hydrocarbon or the like well and constitute a drill string, a casing string, or liner string or tubing string (working strings).

Specification API 5CT from the American Petroleum Institute (API), equivalent to ISO standard 11960: 2004 from the International Standardization Organization (ISO), governs tubes used as casing or tubing, and specification API 5B defines standard threading for those tubes.

API specification 7 defines threaded connectors with shoulders for rotary drill rods.

The manufacturers of threaded tubular connection components have also developed premium threaded connections which have specific threading geometries, and specific means providing them with better performance in service, in particular as regards mechanical strength and seals. Examples of such premium threaded connections and said specific means have, for example, been described in European and United States patents EP 0 488 912, U.S. Pat. No. 4,494,777 and EP 0 767 335.

Said components include a threaded male end which is intended to be screwed into a threaded female end of another drilling or working component. Thus, it is vital that their male end be damaged, polluted or deteriorated as little as possible from the moment they leave their production line to the moment of use, but also between two successive uses. It will be understood that not only the threading but also any bearing surfaces or abutments which each have specific and complementary functions, in particular to ensure a seal during use, should be protected against corrosion, dust and shock (or knocks).

The ends of said components are generally coated just before assembly with a grease with anti-galling properties. API RP 5A3 (formerly API Bul. 5A2) or ISO 13678: 2000 defines said grease and the ways in which said grease can be used are described in API RP 5C1.

However, the grease in API RP 5A3 suffers from a number of disadvantages linked to their content in toxic constituents, in particular lead, to the excess quantity of grease applied and to the need to apply the grease just before dropping the components into the well.

Thus, U.S. Pat. No. 6,933,264, U.S. Pat. No. 6,869,111 and International document WO 2003/102457 propose replacing that grease, applied finally with a brush to the end of a component, by a factory-applied thin layer of a predetermined thickness of a "semi-dry" lubricant which is free of heavy metals.

Further, U.S. Pat. No. 6,027,145, EP 1 211 451 and French patent application FR 05 10503 (not yet published) propose to replace the grease finally applied with a brush to the end of the component by a thin factory-applied layer of a predetermined thickness of a dry lubricant based on particles of solid lubricants.

In those cases in which a dry or semi-dry lubricant is factory applied, it is also and more particularly necessary to protect the layer of lubricant product with which the ends of the components are coated as much as possible as well from mechanical removal as from pollution (sand, debris) which may be prejudicial to the efficacy of the lubricant product.

To achieve that protection, in general, as required by specification API 5CT (in paragraph 12.2), a protective device is placed on the male and female ends of the threaded tubular connection components. A number of devices of that type have been proposed, in particular in EP 0 148 807, US-2006/0042709, WO 2005/075877 and WO 2005/024282, the last three documents aiming more particularly at protectors for connections which have been previously coated with lubricant applied in factory.

Because of the respective embodiments, such known protective devices offer protection against shocks (or knocks) which is rather satisfactory but, in the case of protective devices for the male end, they provide a seal downstream of the threading (and thus in a zone the diameter of which is often that of the body or regular section of the component) which varies as a function of dimensional variations in the components. Thus, the external diameter of a tube satisfying specification API 5CT may vary by + or −0.79 mm for tubes with a diameter of less than 114.3 mm and by −0.5% to +1% of the diameter for tubes with a diameter of 114.3 mm or more (i.e. from −0.89 mm to +1.78 mm for a tube 177.8 mm in diameter).

In other words, such protective devices for the male end are not adaptable as regards a seal in the event of dimensional deviations in the components (apart from machining the outside of the components, which has its drawbacks) and may be very tight and thus difficult to attach. Their attachment may in particular result in damage to the portions of the protective device and/or scratch and remove all or part of the lubricant layer which coats the male ends, in particular when it is installed permanently. In fact, the fact that a protector has to be capable of being readily attached and removed several times without removing the lubricant so as to allow inspection of the male ends during storage of the components or to protect the male ends of components removed from the wells, must be taken into account.

No known protective device is entirely satisfactory; the invention therefore aims to improve the situation.

To this end, the invention proposes a device which on the one part is intended to protect the male end of a threaded tubular connection component for drilling and working hydrocarbon wells, which end is externally provided with at least one external threading and comprises a free terminal portion, and which on the other part also comprises:
  a protector body produced in the form of a first sleeve and intended to protect at least part of the external threading and the free terminal portion; and
  a sealing element suitable to be positioned in contact firstly with the component, at least at a portion located downstream of the external threading of the male end, and secondly with the protector body so as to provide a first seal downstream of the external threading.

This device is characterized in that:
  it further comprises fixing means for displacing the sealing element and/or the protector body radially towards the component, defining "open" and "closed" positions of the device, in which the sealing element and/or the protector body are respectively not in contact and in tight contact with the component; and in that the first seal is obtained in the closed position of the device.

The protective device of the invention may have a number of variations; at least some of the characteristics may be combined, in particular:

the first seal may be provided on a regular section of the component located immediately downstream of the male end;

it may comprise means suitable for providing a second seal at the free terminal portion of the male end;

said second seal may, for example, be provided on a transverse annular surface at the end of the free terminal portion;

its protector body may cover an annular transverse end surface of the free terminal portion;

its sealing element may be produced from a soft elastic material;

its fixing means may be annular circumferential clamping means;

it may be arranged so that in the open position it can be freely fitted onto the male end;

its sealing element may be produced in the form of a second sleeve;

said second sleeve may, for example, be produced from a transparent material;

said second sleeve may, for example, generally be disposed in the axial extension of said first sleeve. In this case, complementary fixing means may be arranged on the protector body and on the sealing element so as to attach the protector body and the sealing element together;

the sealing element may, for example, be produced in the form of a ring comprising a portion intended to receive the fixing means and extended by a rim with a generally frustoconical form of revolution. In this case, the protector body may comprise a terminal portion extending to the free terminal portion of the male end, and opposite said terminal portion, another terminal portion comprising a first sub-portion with a generally frustoconical form of revolution and intended to be force fitted onto the tapered rim of the sealing element. The first sub-portion and the tapered rim then form part of the complementary fixing means;

the end portion may then comprise a second sub-portion provided with an internal threading intended to be screwed onto a selected portion of the external threading of the male end;

in a variation, the second sleeve may, for example, be interposed between the male end and the first sleeve over at least a portion of the axial length of the first sleeve;

the second sleeve may then extend to cover a transverse annular end surface of the terminal portion of the male end;

the second sleeve may, for example, comprise i) a first portion at least partly located above the external threading of the male end; and ii) a second portion extending the first portion on the side opposite to the free terminal portion of the male end, split into tongues and capable of receiving the fixing means. In this case, the fixing means may comprise a ring or a nut intended to be placed on the second portion in the open position, arranged to cooperate with the tongues to radially displace the tongues towards the male end, following axial displacement of the fixing means, along the tongues towards a free end thereof, and to immobilize the second sleeve with respect to the component downstream of the external threading of the male end in the closed position;

the second portion may optionally comprise a tapered external threading. In this case, the fixing means may comprise a nut intended to be placed on the second portion in the open position, provided with an internal threading and intended to be screwed up in a progressively radially tightening manner on the external threading of the second portion so as to radially displace the ring towards the component and to immobilize the ring on the male end downstream of its external threading in the closed position;

the first portion of the second sleeve may optionally comprise a first sub-portion intended to be placed downstream of the external threading of the male end at the location of an annular internal bulge which it possesses and which is arranged to be radially compressed against the component in the closed position;

the first portion of the second sleeve may optionally be provided with an external threading. In this case, on the one hand the first sleeve may comprise an internal threading intended to be screwed up on the external threading of the first portion of the second sleeve, and on the other hand the external threading of the first portion of the second sleeve may be located on the first sub-portion, and thirdly the internal threading may be located on a terminal portion of the first sleeve;

the sealing element may optionally be produced in the form of a ring comprising a principal portion intended to be at least partially, interposed between i) a first portion of the first sleeve, located on the side opposite to the terminal portion of the male end, and ii) the component downstream of the external threading of the male end, extended by a first rim split into tongues, on the side opposite to the terminal portion of the male end, and intended to receive the fixing means. In this case, the fixing means may comprise one circumferential clamping means intended to radially displace the ring at the location of its tongues towards the component and to immobilize the ring with respect to the male end downstream of the external threading thereof in the closed position;

the principal portion of the ring may then optionally comprise an annular internal bulge intended to be pressed against the component downstream of the external threading of the male end in the closed position;

the first portion of the first sleeve may optionally comprise a second internal threading intended to be screwed onto an external threading disposed on the principal portion of the ring;

the protector body may, for example, be screwed onto the second sleeve before the device is disposed on the male end;

the protector body may, for example, be arranged to be unscrewed from or screwed up again on the second sleeve after the sleeve has been immobilized with respect to the component downstream of the external threading of the male end in the closed position;

the sealing element may, for example, comprise a first intermediate portion placed downstream of the external threading of the male end, and an end portion which extends the intermediate portion on the side opposite to the terminal portion of the male end, which is split into tongues and which is intended to receive the fixing means. In this case, the fixing means may comprise a circumferential clamping means intended to radially displace the second sleeve at its tongues towards the component, and to immobilize the second sleeve at its tongues with respect to the male end downstream of its external threading in the closed position;

the first intermediate portion of the second sleeve may then optionally comprise an internal annular bulge intended to be compressed against the component downstream of the external threading of the male end in the closed position;

the first intermediate portion of the second sleeve may, for example, be provided with an external threading. In this case, the first sleeve may comprise a terminal portion comprising an internal threading intended to be screwed onto the external threading of the second sleeve in the closed position, after placing the second sleeve on the male end;

the second sleeve may, for example, be provided with an internal threading intended to be screwed onto a selected portion of the external threading of the male end;

its fixing means may comprise a circumferential clamping means disposed about the protector body and intended to radially displace the sealing element towards and into contact with the component and to immobilize the protector body and the sealing element with respect to the male end in the closed position;

the second sleeve may then optionally comprise an at least partially annular external bulge which cooperates with a recess in the first sleeve and arranged to be radially compressed between the first sleeve and the male end in the closed position;

the first sleeve may optionally be constituted by two complementary portions arranged to be fixed one to the other in the closed position;

its sealing element may have a generally frustoconical external form of revolution. In this case, the first sleeve has an internal generally frustoconical form of revolution which can be fitted in a tight manner on the sealing element;

its sealing element may be produced in the form of a ring. In this case, the first sleeve may comprise i) a first portion comprising a first sub-portion which defines a recess intended to receive the ring before placing the first sleeve on the male end and for placing the ring downstream of the external threading of the male end into the closed position, and ii) a second portion for receiving the fixing means, and the fixing means may be arranged to radially displace the second portion of the first sleeve towards the component and immobilizing the second portion with respect to the male end downstream of its external threading in the closed position;

the second portion of the first sleeve may, for example, comprise at least one axial opening partially surrounded by two tabs positioned facing each other and each provided with a hole. In this case, the fixing means may comprise at least one bolt intended to be introduced into the holes of the facing tabs and screwed up so as to close the rims of the opening by radially displacing the second portion of the first sleeve towards the male end and immobilizing the second portion with respect to the component downstream of the external threading of the male end in the closed position;

in a variation, the second portion of the first sleeve may, for example, be split into tongues and comprise an external threading. In this case, the fixing means may comprise a nut intended to be placed without being screwed up on the second portion of the first sleeve before placing it on the male end and provided with an internal threading intended to be screwed up in a radially tight manner on the external threading of the second portion of the first sleeve to radially displace the second portion of the first sleeve at the tongues towards the male end and to immobilize the second portion of the first sleeve with respect to the component downstream of the external threading of the male end in the closed position;

in the closed position, the fixing means may be charged with radially compressing the ring between the recess and the component downstream of the external threading of the male end;

its sealing element may be produced in the form of a deformable ring comprising a central portion between the first and second ends, the central portion being capable of being flexed towards the component following an axial compressive force on the ends of the deformable ring and of being pressed against the component downstream of the external threading of the male end in the closed position;

the deformable ring has, for example, an axial length which is between 4 times and 40 times its radial thickness;

the diameter of the central portion of the deformable ring is, for example, smaller than its ends;

the first sleeve may, for example, comprise on the one hand a terminal portion arranged so as to receive the first end of the ring to place it downstream of the external threading of the male end and on the other hand a first intermediate portion provided with an external threading. In this case, the fixing means may comprise a nut comprising a first portion arranged to receive the second end of the ring and a second portion provided with an internal threading intended to be attached to the external threading of the first intermediate portion of the first sleeve, to allow axial displacement of the nut on the external threading of the first sleeve, said axial displacement being such that an axial force directed towards the central portion of the ring is exerted on the first and second ends thereof to flex it and press it against the component downstream of the external threading of the male end in the closed position;

the external threading of the first intermediate portion of the first sleeve may, for example, be arranged so as to allow axial displacement of the nut by screwing onto the external threading of the first sleeve;

the external threading of the first intermediate portion of the first sleeve may, for example, be arranged to allow axial displacement, by clip fitting, of the nut with respect to the external threading of the first sleeve;

the external threading of the first intermediate portion of the first sleeve and/or the internal threading of the ring may then have a saw tooth thread profile. As an example, the external threading of the first intermediate portion of the first sleeve and/or the internal threading of the ring have (has) two flanks with different inclinations with respect to the axis of the device, the inclination of the least inclined flank being less than or equal to three times the complement to 90 degrees of the angle of inclination of the most inclined flank;

the first sleeve may optionally comprise an external shoulder defining an axial abutment for the nut in the closed position of the device;

in a variation, the terminal portion of the first sleeve may, for example, comprise a first external shoulder defining an axial abutment. In this case, firstly, the first sleeve may comprise a first intermediate portion provided with a second external protuberance which defines an axial anti-return abutment; secondly, the device may also comprise a fixing element comprising an internal recess with a form which is substantially identical to that of the second axial anti-return protuberance and an external threading, and suited to be initially placed between the first external shoulder and the second external protuberance before placing the pre-assembled device on the male end in the open position, and thirdly, the fixing means may comprise a nut comprising a first portion arranged so as to receive a second end of the ring and a second portion provided with an internal threading intended to be screwed onto the external threading of the fixing element before placing the pre-assembled device on the male end in the open position, and fourthly, the nut is suitable to be axially displaced by driving the fixing element so that in the closed position the second external protuberance is locked inside its recess, thus prohibiting axial displacement in the reverse direction of the fixing element and by flexing the ring to press it against the component downstream of the external threading of the male end in the closed position;

the second external protuberance may optionally have a dissymmetric profile with a relatively less inclined flank and an abrupt flank;

the internal threading of the nut and the external threading of the fixing element may optionally authorize, by their cooperation, unscrewing the bolt, thus allowing the device to move from a closed position to an open position in order to withdraw the first sleeve and if necessary to screw the nut up again, thus allowing the device to return to a closed position;

the terminal portion of the first sleeve may, for example, comprise openings. In this case, the first portion of the ring may comprise radial projections intended to be housed by clip fitting inside the openings;

the first sleeve may optionally be provided with an internal threading intended to be screwed onto a selected portion of the external threading of the male end;

the external threading of the male end may comprise at least one zone of perfect threads and at least one zone of imperfect threads. In this case, the selected portion of the external threading may be disposed in a zone of perfect threads; (S6, S9 to S11);

its protector body may be produced from a thermoplastic material selected from a group comprising at least mixtures based on polycarbonate, polyoxymethylene or polyacetal (POM), and high density polyethylenes (HDPE) or ultra high density polyethylenes (UHDPE);

the thermoplastic material may, for example, be at least partially calceolate;

its sealing element may be produced from a soft material selected from at least thermoset rubbers and thermoplastic elastomers;

the thermoset rubbers may, for example, be selected from at least NBRs and CRs;

the thermoplastic elastomers may, for example, be selected from at least TPE-Es and TPE-Us;

its male end may be factory coated (where it was manufactured) with a thin layer of lubricant with a view to being screwed on the drill site onto a corresponding female end of another component.

The invention also proposes a first method for positioning a protective device of at least one of the types presented above on a male end of a component of a threaded tubular connection for drilling and working hydrocarbon wells.

Said first method is characterized in that the protector body, nut and ring are pre-assembled in the open position, then the device is screwed up until the protector body is applied against the transverse annular end surface of the free terminal portion of the male end so as to produce a second seal, and the nut is screwed up to define the closed position of the device and the first seal.

The invention also proposes a first machine intended to carry out the first method presented above and to this end comprises a holding means for holding the male end, a first screw means for screwing the protector body onto the male end, a detection means for detecting contact of the protector body against the transverse annular end surface of the free terminal portion of the male end and for stopping the first screw means when contact is detected, and a second screw means for screwing up the nut to a selected position to define the closed position of the device.

The invention also proposes a second method for positioning a protective device of at least one of the types presented above on a male end of a component of a threaded tubular connection for drilling and working hydrocarbon wells.

Said second method is characterized in that the protector body, bolt, fixing element and the ring are pre-assembled in the open position, then the device is screwed up until it applies the protector body against the annular transverse end surface of the free terminal portion of the male end to produce a second seal, and a thrust is exerted axially on the nut to a selected position, so as to flex the ring and thereby define the closed position of the device and the first seal (S10, S11).

In said second method, and in the presence of a first sleeve comprising an external shoulder defining an axial abutment for the nut in the closed position of the device, the selected position may result from said nut bearing against the external shoulder of the protector body.

In a variation of the second method, which corresponds to other embodiments of the device, the selected position may be that in which the second external protuberance of the protector body is locked in the recess of the fixing element.

The invention also proposes a second machine for carrying out the second method presented above, and to this end comprises a holding means for holding the male end, a screw means for screwing the protector body onto the male end, a detection means for detecting contact of the protector body against the transverse annular end surface of the free terminal portion of the male end and to stop the first screw means when contact is detected, and an axial thrust means intended to axially thrust the nut to a selected position so as to define the closed position of the device.

The invention also proposes a third method for inspecting a male end of a component of a threaded tubular connection for drilling and working a hydrocarbon well, said male end being provided with a protective device of at least one of the types presented above.

Said third method is characterized in that it consists of detaching the protector body from the sealing element then removing the protector body from the male end leaving the sealing element in place, then inspecting the male end and replacing the protector body on the male end and then once more attaching the protector body to the sealing element.

Further, this third method allows the male end to be inspected through the transparent first portion of the second sleeve.

Figure 1B:
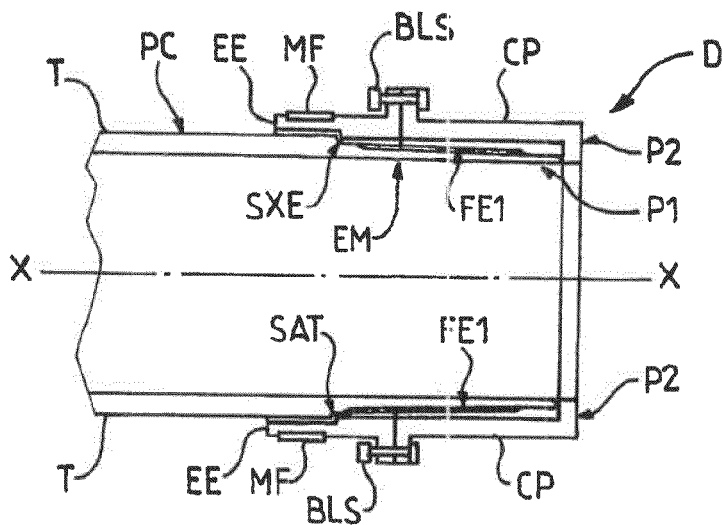
Figure 2A:
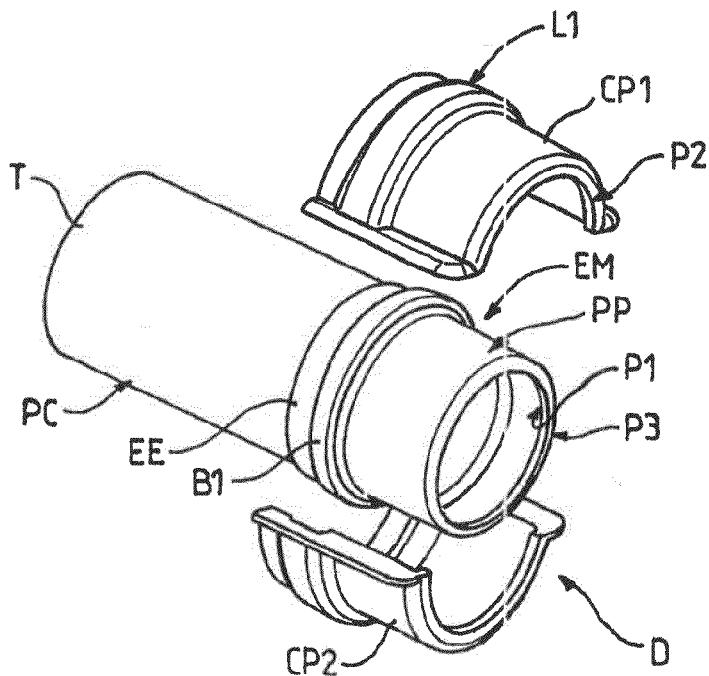
Figure 2B:
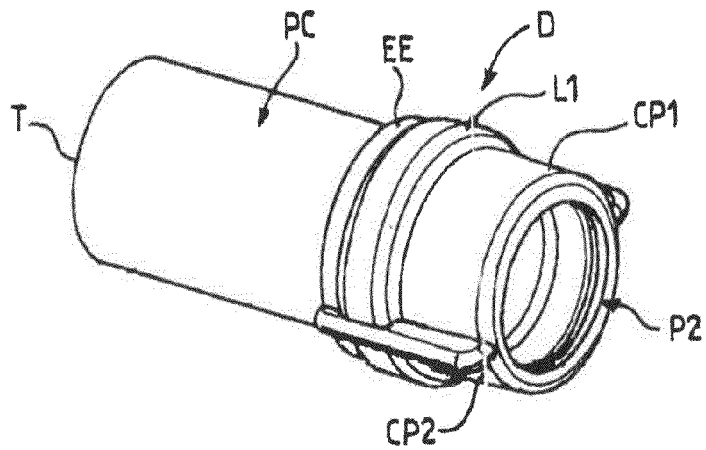
Figure 2C:
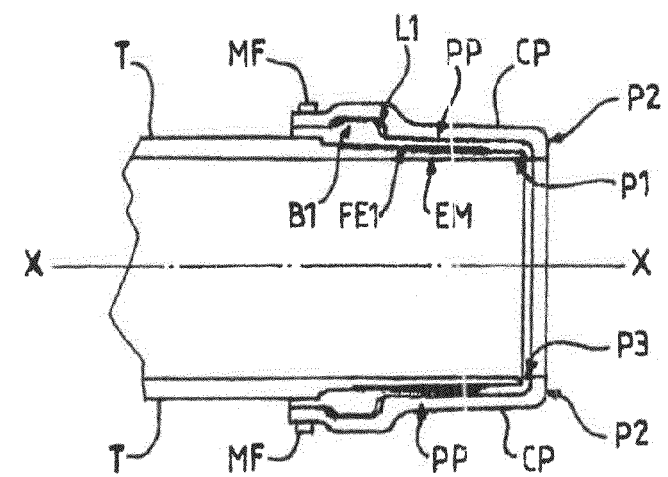
Figure 3A:
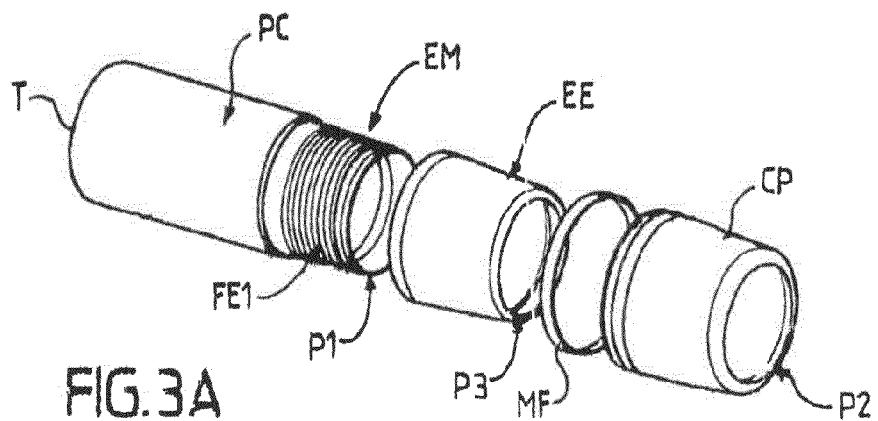
Figure 3B:
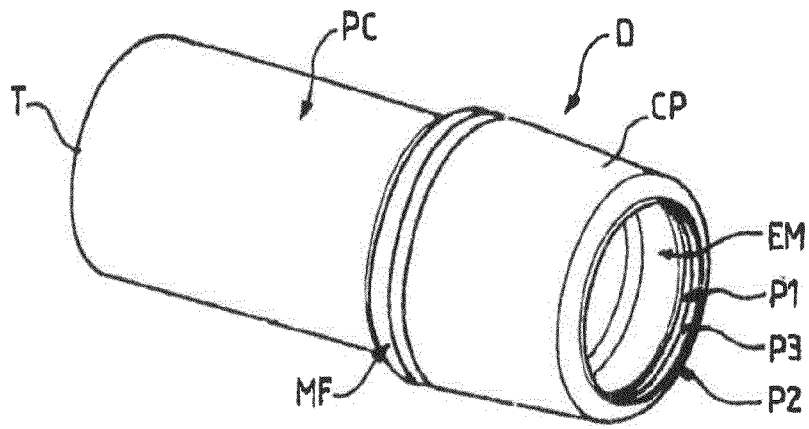
Figure 3C:
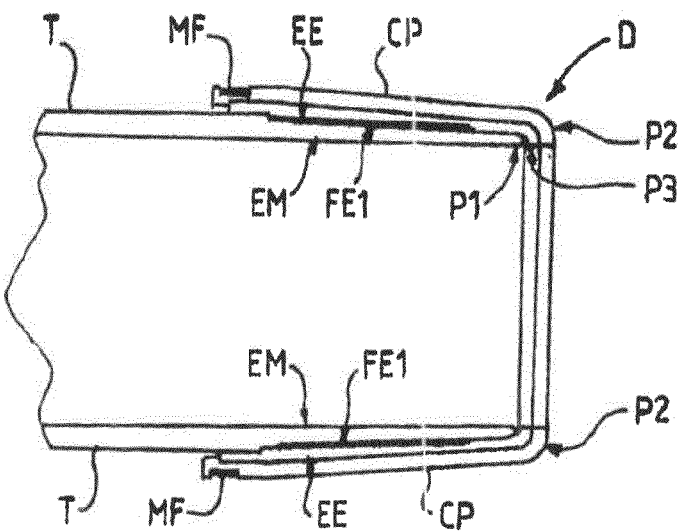
Figure 4A:
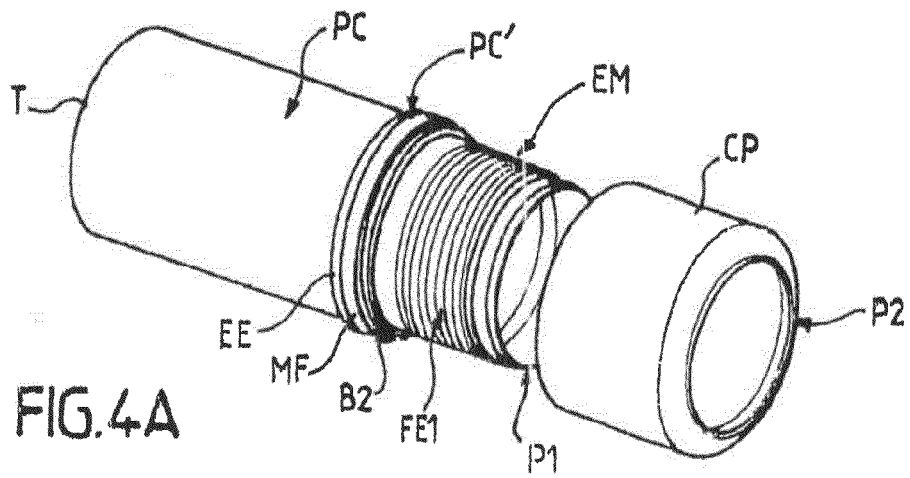
Figure 4B:
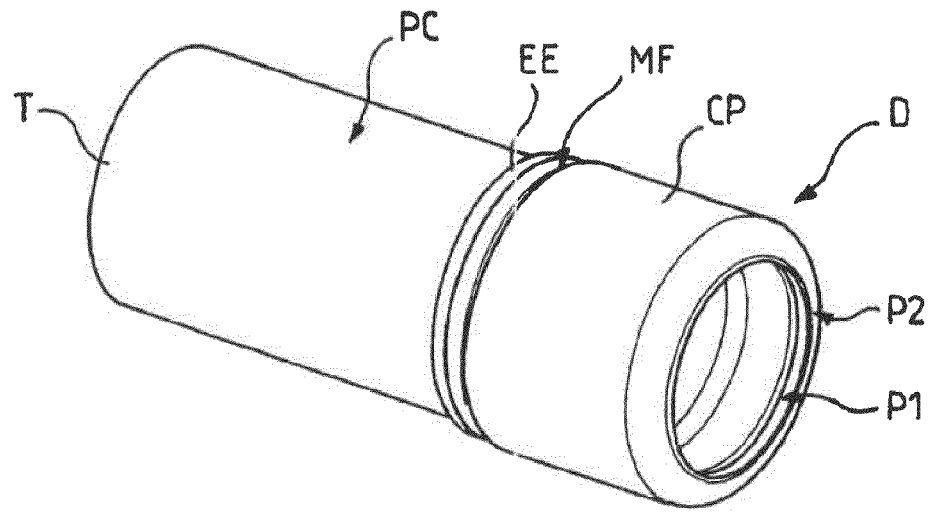
Figure 4C:
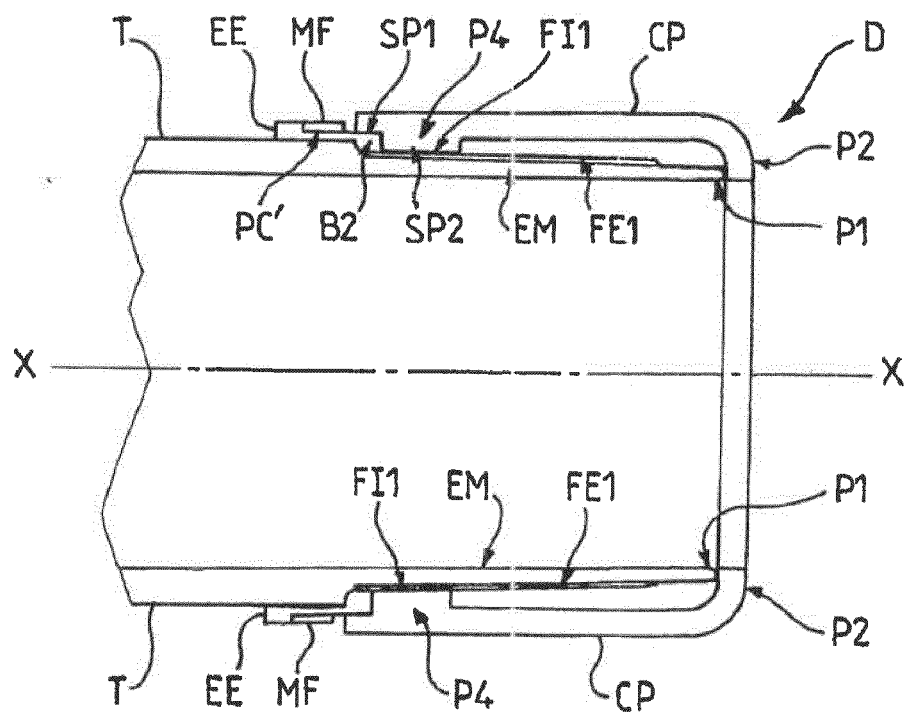
Figure 7A:
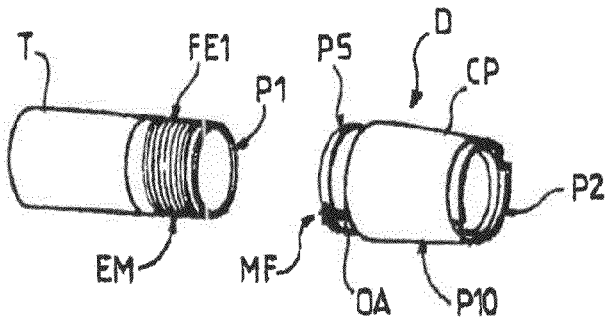
Figure 7B:
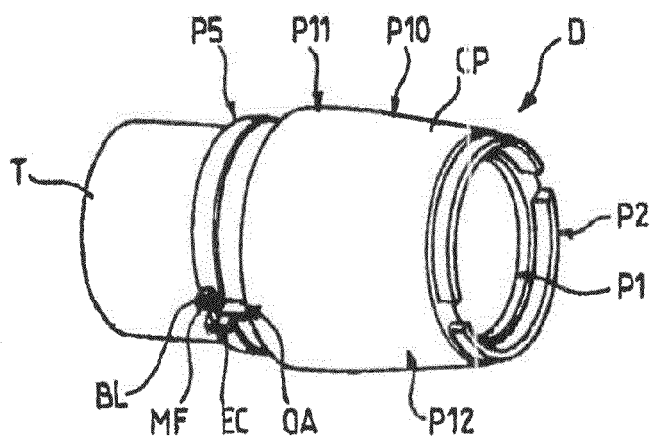
Figure 7C:
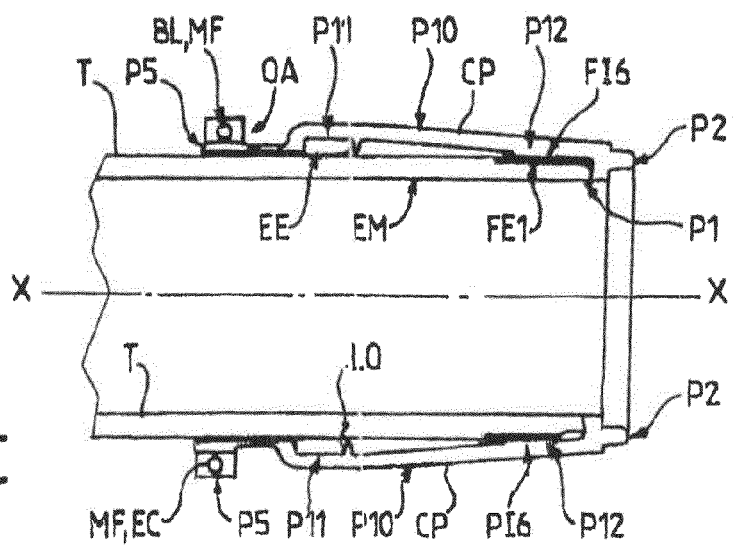
Figure 10A:
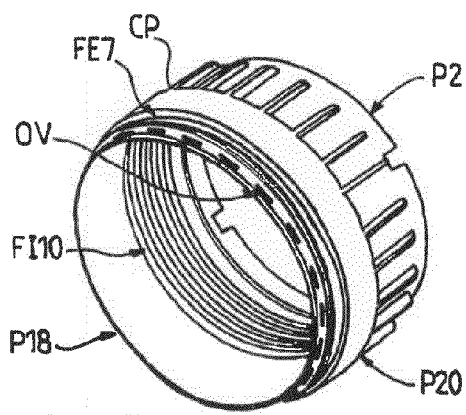
Figure 10B:
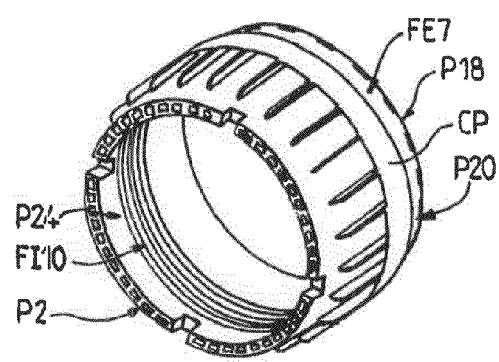
Figure 11:
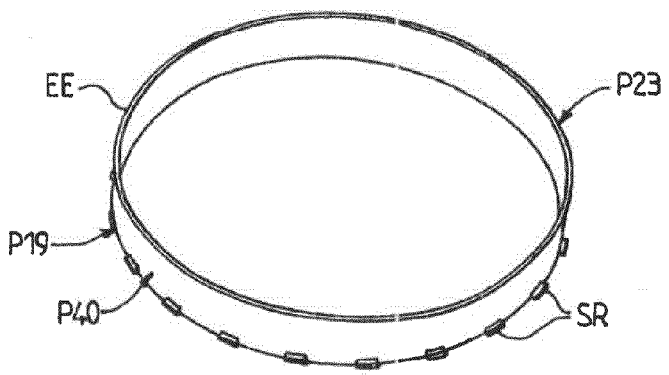
Figure 12A:
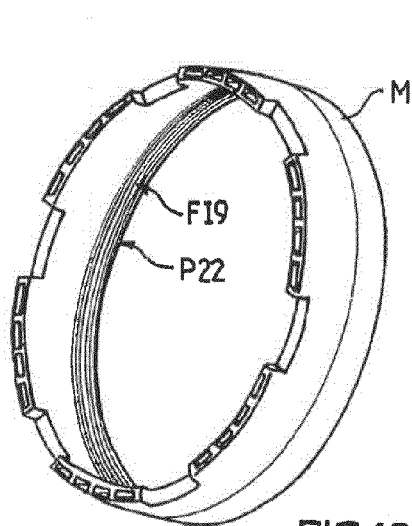
Figure 12B:
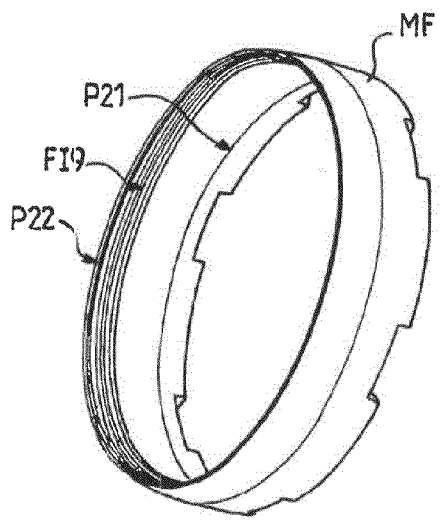
Figure 13:
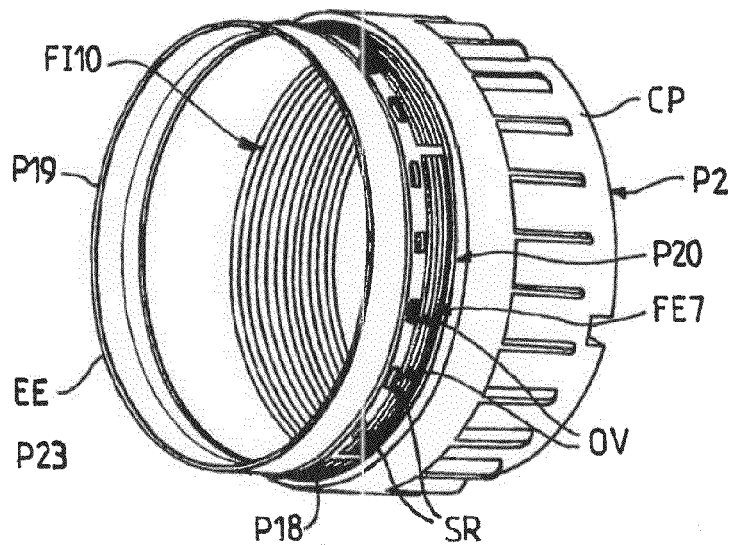
Figure 14:
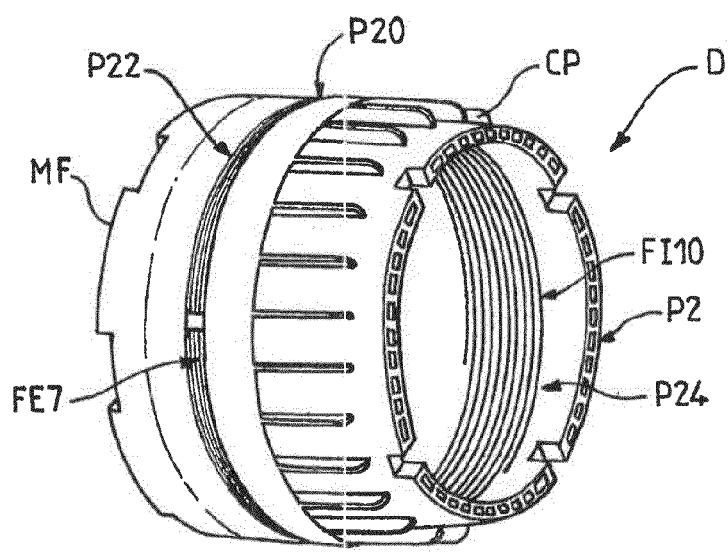
Figure 15:
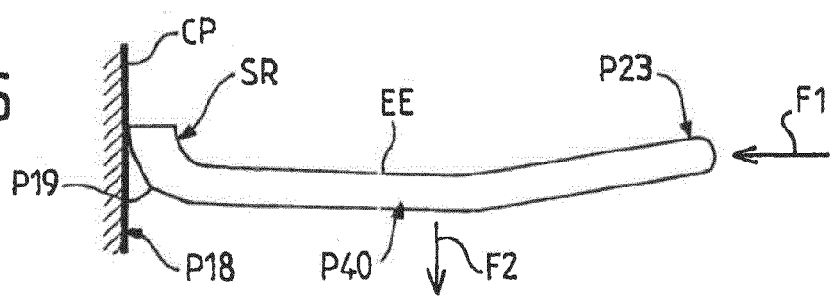
Figure 16:
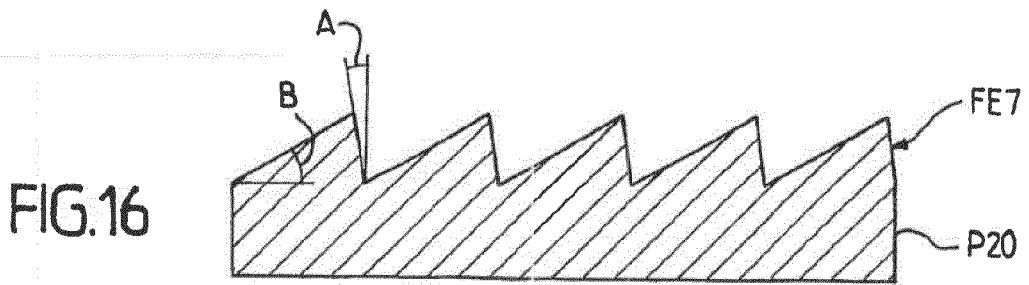
Figure 17A:
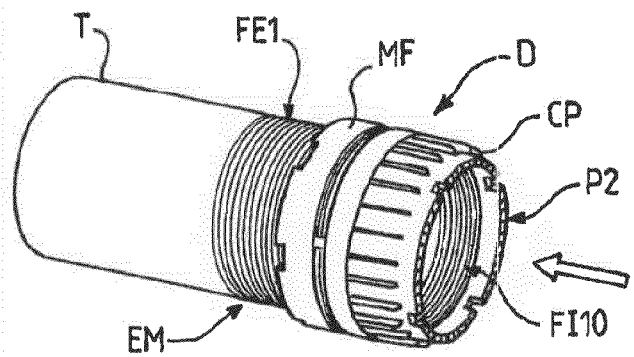
Figure 17B:
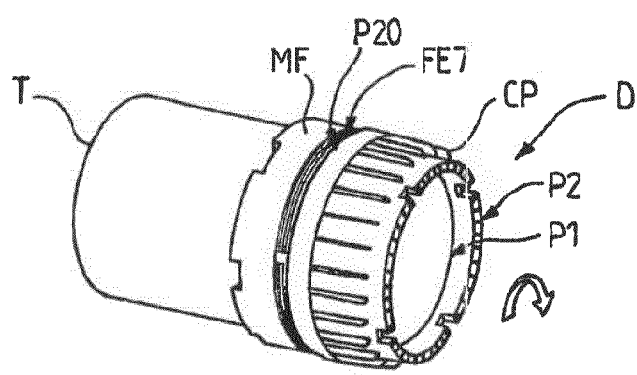
Figure 17C:
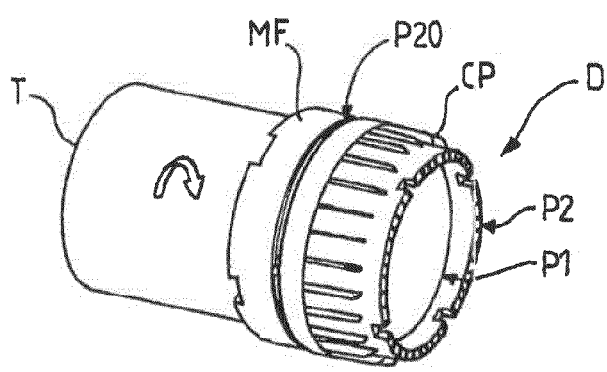
Figure 18:
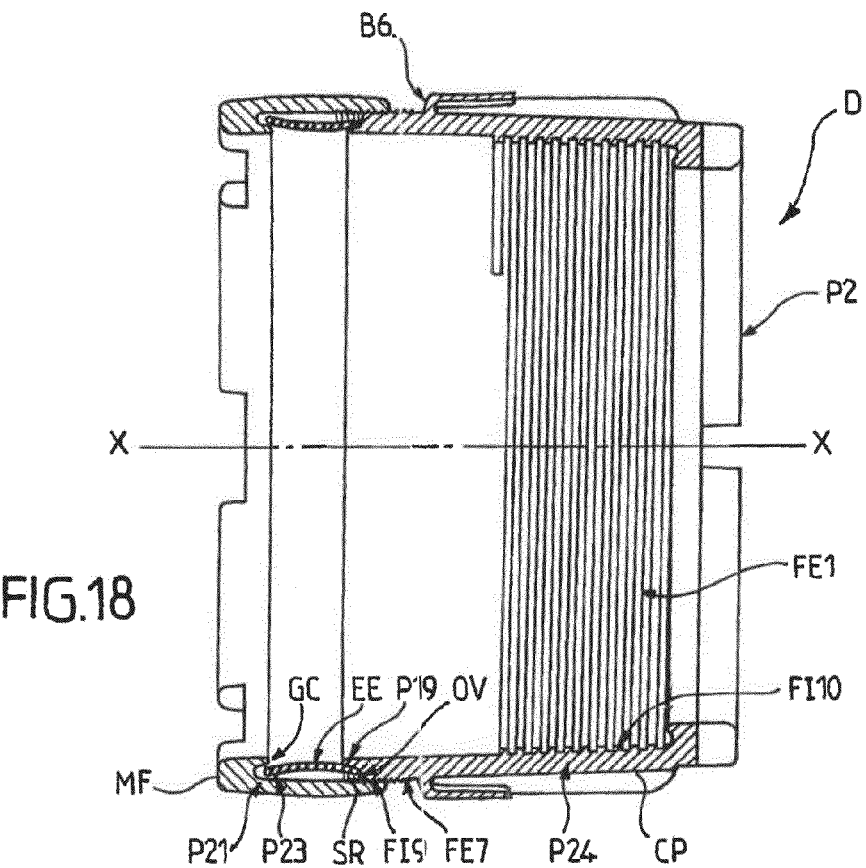
Figure 19:
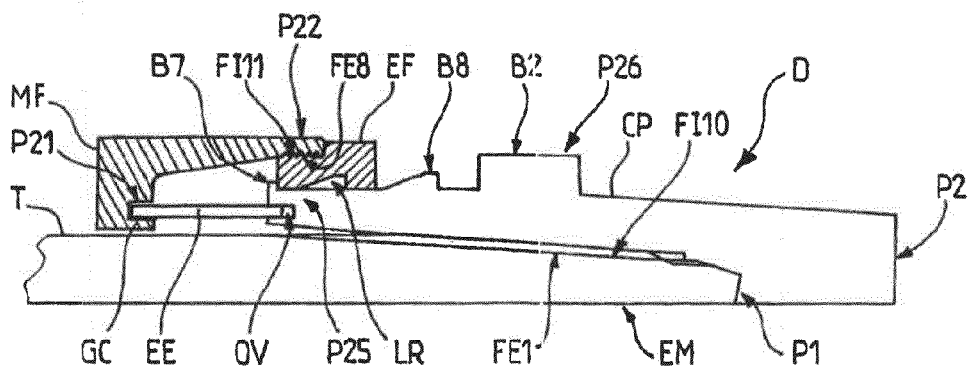

Other characteristics and advantages of the invention will become apparent from the following detailed description and accompanying drawings in which:

FIGS. 1A and 1B diagrammatically show, in respective perspective and sectional views along the axis XX of the component, a first embodiment of a protective device of the invention placed in the closed position on the male end of a VAM FJL type threaded tubular connection;

FIGS. 2A, 2B and 2C diagrammatically show, in respective exploded perspective and non-exploded perspective views and in section along the axis XX of the component, a second embodiment of a protective device of the invention placed in the closed position on a male end of a VAM FJL type threaded tubular connection;

FIGS. 3A, 3B and 3C diagrammatically show, in respective exploded perspective view prior to positioning, in non-exploded perspective view after positioning (closed position) and in section along the axis XX of the component after positioning (closed position), a third embodiment of a protective device of the invention on the male end of a VAM FJL type threaded tubular connection:

FIGS. 4A, 4B and 4C diagrammatically show, in respective exploded perspective view during positioning, and in non-exploded perspective view after positioning (closed position) and in section along the axis XX of the component after positioning (closed position), a fourth embodiment of a protective device of the invention on the male end of a VAM FJL type threaded tubular connection;

FIGS. 5A, 5B, 5C, 5D and 5E diagrammatically show, in respective exploded perspective view prior to positioning, in non-exploded perspective view during positioning (open position), in non-exploded perspective view after positioning (closed position) and in section along the axis XX of the component after positioning (closed position), a fifth embodiment of a protective device of the invention on the male end of a VAM TOP type threaded tubular connection;

FIGS. 6A, 6B, 6C, 6D and 6E diagrammatically show, in respective exploded perspective view prior to positioning, in non-exploded perspective view at the start of positioning, in exploded perspective view during positioning (open position), in non-exploded perspective view after positioning (closed position), and in section along the axis XX of the component after positioning (closed position), a sixth embodiment of a protective device of the invention on the male end of a VAM TOP type threaded tubular connection:

FIGS. 7A, 7B and 7C diagrammatically show, in respective exploded perspective view prior to positioning, in non-exploded perspective view after positioning (closed position) and in section along the axis XX of the component after positioning (closed position), a seventh embodiment of a protective device of the invention on the male end of a VAM TOP type threaded tubular connection;

FIGS. 8A, 8B, 8C, 8D and 8E diagrammatically show, in respective exploded perspective view before positioning, in exploded perspective view at the start of positioning, in non-exploded perspective view at the end of positioning (open position), in non-exploded perspective view after positioning (closed position) and in section along the axis XX of the component after positioning (closed position), an eighth embodiment of a protective device of the invention on the male end of a VAM TOP type threaded tubular connection;

FIGS. 9A, 9B, 9C, 9D, 9E and 9F diagrammatically show, in respective perspective view before positioning, in exploded perspective view at the start of positioning, in non-exploded perspective view at the end of positioning (open position), in non-exploded perspective view after positioning (closed position), in exploded perspective view for inspection of the threading (closed position) and in section along the axis XX of the component after positioning (closed position), a ninth embodiment of a protective device of the invention on the male end of a VAM TOP type threaded tubular connection;

FIGS. 10A and 10B diagrammatically show, in perspective views at two different angles prior to assembly, a protector body of a tenth embodiment of a protective device of the invention for a male end of a VAM TOP type threaded tubular connection;

FIG. 11 diagrammatically shows, in a perspective view prior to assembly, a sealing element of a tenth embodiment of the protective device of the invention;

FIGS. 12A and 12B diagrammatically show, in perspective views at two different angles prior to assembly, a nut (fixing means) of a tenth embodiment of a protective device of the invention;

FIG. 13 diagrammatically shows, in perspective view, the assembly of the protector body and the sealing element of a tenth embodiment of the protective device of the invention;

FIG. 14 diagrammatically shows, in perspective view, the complete assembly of the protector body, the sealing element and the nut of a tenth embodiment of the protective device of the invention;

FIG. 15 diagrammatically shows, in cross section along the axis XX of the component, the stresses and deformations undergone by the sealing element of the tenth embodiment of the protective device of the invention during passage of the protective device into the closed position;

FIG. 16 diagrammatically shows, in cross section along the axis XX of the component, the external threading of the protector body of a tenth embodiment of the protective device of the invention:

FIGS. 17A, 17B and 17C diagrammatically show, in respective non-exploded perspective views at the start of positioning, after positioning in the open position and after positioning in the closed position, the tenth embodiment of the protective device of the invention;

FIG. 18 diagrammatically shows, in cross section along the axis XX of the component after positioning, the tenth embodiment of the protective device of the invention; and FIG. 19 diagrammatically shows, in partial cross section along the axis XX of the component, a portion of an eleventh embodiment of the protective device for the invention of a male end of a VAM TOP type threaded tubular connection in the open position after positioning.

The accompanying drawings not only serve to complete the invention but also contribute to its definition if necessary.

The aim of the invention is to protect the threaded male end of a tubular component of a threaded tubular connection (intended for drilling or working a hydrocarbon or the like well) against mechanical damage, pollution (chemical and material) and deterioration (corrosion) from the moment it leaves the production line to the moment of use (with several screw-unscrew cycles for the protective device), but also between two successive uses, limiting (or even avoiding) scraping and/or eliminating the storage (anti-corrosion) and or makeup lubricant, more particularly when said lubricant is applied in a permanent manner (lubricant of the semi-dry or dry type, discussed above), despite dimensional variations in the tubular component (especially its external diameter). It also aims to allow rapid and reliable factory mounting, which can be automated, of the protective device onto a male end and allow ready inspection of the condition of the threading before use or between two successive uses of the component.

We shall consider below that the component is intended for drilling or working a hydrocarbon well and that it is equipped with a male end of a threaded and coupled tubular connection of the VAM (registered trade mark) family or the like. However, the invention is not limited to that type of component, nor to the type of male end cited above. The invention in fact concerns any type of threaded tubular connection component for drilling or working and any type of threaded male end of a component and especially those of the API type and the "premium" type, such as VAM type threaded tubular connections.

Further, the term "male end" as used here means a male end of a component (hereinafter termed a "tube" by way of purely illustrative example) provided with an external threading and a free terminal portion. The term "male end" (EM) thus does not designate only the free end surface of the tube (T), but also the whole portion of the tube (T) comprising the (male) means for connection to another component of the threaded tubular connection provided with female connection means (female end).

It should be recalled that a tube or component (T) comprises a body or regular section (PC) terminated by a male end (EM) or a female end.

The external threading may be in one or more distinct threaded portions disposed along cylindrical or tapered surfaces.

When the or a threaded portion is tapered, it may be subdivided into a sub-portion which has perfect threads the profile of which is constant and without irregularity or imperfection (for example a burr) and a sub-portion which has vanishing or imperfect threads the height of which decreases progressively and the profile of which may have irregularities or imperfections.

The threading of the male end of the component may comprise at least two distinct threaded portions which are axially and/or radially spaced from each other, each of those portions possibly including perfect and vanishing threads.

The free terminal portion of the male end of the component is generally terminated by an annular surface with a substantially transverse orientation.

The male end may also comprise one or more axial abutment surfaces for a female end of another component intended to be connected with the component under consideration (at the free end, downstream of the threading or between two threaded portions) and one or more metal/metal sealing surfaces (at the free end, downstream of the threading or between two threaded portions) with the female end under consideration. The protective device of the invention is preferably designed so that it also protects these abutment surfaces and/or said sealing surfaces from damage or corrosion.

Some of the following embodiments, given by way of non limiting example, pertain to a male end of a VAM TOP (registered trademark) threaded and coupled tubular connection and others pertain to a male end of a VAM FJL integral flush threaded tubular connection (described in particular in British patent GB 1587836).

It should be recalled that a male end of a VAM TOP threaded tubular connection comprises:
- a tapered threading with a sub-portion of perfect threads on the free terminal portion side and a sub-portion of vanishing threads on the body (or regular section) side of the component;
- an abutment surface constituted by the transverse annular surface of the free terminal portion of the male end; and
- a metal/metal sealing surface adjacent to the abutment surface on the external peripheral surface of the free terminal portion.

A male end of a VAM FJL threaded tubular connection comprises:
- a tapered threading with a sub-portion of perfect threads on the free terminal portion side and a sub-portion of vanishing threads on the body (or regular section) side of the component;
- an external abutment downstream of the threading having a transverse annular abutment surface; and
- two sealing surfaces, one external sealing surface adjacent to the external abutment surface and an internal sealing surface adjacent to an annular transverse annular surface at the free terminal portion of the male end.

We shall refer now to FIGS. 1A and 1B to show the invention and detail its implementation in the form of a first embodiment.

A protective device D of the invention generally comprises a protector body CP, a sealing element EE and fixing means MF intended to cooperate together once placed on the (threaded) male end EM of a tube T.

The protector body CP is produced in the form of a first sleeve (monobloc or otherwise). It is intended to protect at least a portion of the external threading FE1 of the male end EM and the free terminal portion P1. It comprises a terminal portion P2 intended to be placed at the free terminal portion P1 and preferably has a inward radial projection in the form of a flange, which is thick and adapted to absorb shocks and knocks, and intended to cover the transverse annular surface at the end of the free terminal portion P1 of the male end EM (abutment surface) to ensure a (second) continuous local seal over the entire circumference at that position.

The term "external" as used here means an element disposed along a surface (or a surface) which is orientated in a direction radially opposite to the axis XX of the male end. In contrast, the term "internal" as used here means an element (or surface) which is orientated towards the axis XX of the male element.

Since protection is more particularly mechanical, the protector body CP must have a certain rigidity while being capable of at least partially absorbing knocks. To this end, it may, for example, be produced by injecting a thermoplastic material into a suitable mould. The various categories of thermoplastic materials which may advantageously be used and which may be cited include mixtures based on polycarbonate such as polycarbonate-polyester (PC-PBT or PC-PET), polyoxymethylene or polyacetal (POM) and polyethylenes (PE) with a high or ultra-high density (HDPE, UHDPE).

Annex 1 of API specification API 5CT edition 2005 discloses requirements for threading protection devices, in particular minimum axial and angled (45°) shock resistance values for three temperatures (−46° C., +21° C. and +66° C.).

As an example, it is more particularly possible to select a HDPE produced by BASELL and sold under the trade name LUPOLEN 4261 AG UV 6005, a UHDPE produced by TICONA and sold under the trade name GUR 5113, a PC-PBT produced by BAYER and sold under the trade name MAKROBLEND S7916 or a POM produced by DU PONT and sold under the trade name DELRIN 127UV.

It should be noted that the protector body CP may optionally be partially (at least) expanded, in particular in its thicker sections, to provide better knock absorption.

The sealing element EE is intended to be placed in contact firstly with the component T, at least in a part which is located downstream of the external threading FE1 of the male end EM (in the closed position of the device D) and secondly with the protector body CP. More precisely, it is intended to provide a first seal downstream of the external threading FE1. The term "downstream" as used here should be considered with respect to the free terminal portion P1 of the male end EM.

The sealing element EE is preferably produced from a soft material, i.e. a deformable material, which is also elastic, i.e. which can substantially regain its initial form. To this end, it may, for example, be produced by injection-molding from a soft material which is resistant to corrosion and chemical attack. Examples of the various categories of materials which may advantageously be used include thermoset rubbers, in particular those of the NBR or CR type, and thermoplastic elastomers, in particular of the TPE-E or TPE-U type.

The protector body CP and the sealing element EE preferably cooperate together to provide a seal of the external threading FE1 of the male end EM.

The fixing means MF are more precisely intended to displace a portion of the protector body CP and/or the sealing element EE radially towards the axis XX of the device D and thus towards the component T, defining positions termed "open" and "closed" of the device D in which the sealing element EE and/or the protector body CP are respectively capable of being substantially not in contact and in tight contact with the external wall of the male end EM in a zone located downstream of the external threading FE1 of the male end EM.

In accordance with the invention, the first seal is obtained in the closed position of the device D by tight sealed contact between the sealing element EE and the component T downstream of the external threading FE1.

Since the zone located downstream of the external threading FE1 may be part of the body (or regular section) PC of the tube T, it will have a diameter which can vary substantially from one tube to another (for example by 1.5% of the diameter for tubes with an external diameter of 114.3 mm or more). The aim of the invention is to position (install) the device D without the most internal portions scraping the surface of the component T over its regular section PC or over its male end EM (open position) while ensuring good tight contact in the closed position.

The device D may have a number of embodiments. A first embodiment is shown in FIGS. 1A and 1B. In this first embodiment, the sealing element EE is produced in the form of a second sleeve and the fixing means MF are intended to displace the sealing element EE radially towards and into contact with the component T to tighten the sealing element EE on the component T downstream of the external threading FE1 and to immobilize the assembly constituted by the protector body CP and the sealing element EE with respect to the male end EM in the closed position.

The first CP and second sleeves EE are, for example, of a generally cylindrical form of revolution.

In this example, the second sleeve EE is disposed in the axial extension of the first sleeve CP in continuity therewith to allow the first CP and second EE sleeves to be attached via their ends which are in contact. These ends in contact may advantageously be outwardly facing projecting clamps or flanges.

In the open position, the first CP and second EE sleeves may, for example, be fitted freely on the male end EM until the second sleeve EE is at least partially positioned downstream of the external threading FE1 of the male end EM. In the example shown in FIG. 1B, the second sleeve EE is partially placed on the body (or regular section) PC of the component T and partly on the transverse annular external abutment surface SAT, the external sealing surface SXE and the external threading FE1 (in the imperfect thread zone). The external sealing surface SXE is adjacent to the external abutment SAT of the threading side.

The first CP and second EE sleeves are preferably pre-assembled before being placed on a male end EM.

For said pre-assembly, the first CP and second EE sleeve are attached together, for example by means of complementary fixing means, such as screws, clips or hooks. In the example shown in FIGS. 1A and 1B, said attachment is carried out in a non limiting manner by means of bolts BLS passing through corresponding holes in the clamps or flanges of the ends in contact of the first CP and second EE sleeves.

Positioning (or installation) may preferably be carried out as follows. The assembly constituted by the protector body CP and the sealing element EE (not provided with fixing means ME or provided with loose fixing means MF) is freely fitted (open position of device D) on the male end EM (in the direction XX defining the axis of the tube T), until the terminal portion P2 in the form of a flange of the first sleeve (protector body) CP is in contact with the transverse annular end surface of the terminal portion P1 of the male end EM. Preferably, once positioned, the second sleeve EE extends beyond the transverse annular external abutment surface to the body (or regular section) PC of the tube T. Next, it is tightened radially and the second sleeve EE is immobilized with respect to the male end EM by tightening the fixing means MF on the second sleeve EE, which defines the closed position of the device D. For this purpose, it is possible, for example, to use circumferential annular clamping means MF such as a collar (or a clamp or a hooping strip).

The fixing means MF are advantageously disposed downstream of the external threading FE1 (and here at the location of the body (or regular section) PC of the tube T downstream of the transverse external abutment surface) so as to produce a tight fit (first seal) of the second sleeve EE on the component T downstream of the threading FE1 in the closed position of the device D.

It will be understood that in the closed position, the bolt(s) BLS may be removed then the first sleeve CP alone can be removed from the male end EM so as to inspect the external threading FE1 without damaging either the second sleeve EE (remains in place) or the external threading surface FE1 and in particular a layer of lubricant permanently deposited on that surface (the first sleeve CP may if necessary then be re-fitted). In contrast, in the closed position, the device D can only be removed in its entirety from the male end EM by loosening or freeing the collar MF to move the device D into the open position.

Referring now to FIGS. 2A to 2C, we can describe a second embodiment of a device D of the invention. In this second embodiment, the first sleeve (protector body) CP is constituted by two complementary portions CP1 and CP2 which are arranged so as to be attached to each other by complementary fixing means, for example screws, clips or hooks (not shown).

The sealing element EE is produced in the form of a second sleeve which has a principal portion PP which extends to the terminal portion P1 of the male end EM. Preferably, and as shown, the principal portion PP is terminated by a terminal portion P3 in the form of an inwardly extending flange, which is intended to be pressed closely against the transverse annular end surface of the free terminal portion P1 of the male end EM to form a (second) local seal over the entire circumference at that location.

At least the principal portion PP of the second sleeve EE is intended to be interposed between the male end EM and the first sleeve CP over at least a portion of the axial length thereof, in the open position and closed position alike.

In the example shown, the first sleeve CP integrally covers the second sleeve EE, and its terminal portion P2 forms an inwardly extending flange which will squash (or press) the terminal portion P3 of the second sleeve FE against the free terminal portion P1 of the male end EM.

It should be noted that in the open position, the device D may be freely fitted on the male end EM.

The first CP and second EE sleeves are, for example, generally cylindrical forms of revolution. Further, the first sleeve CP may optionally be constituted by two complementary portions CP1 and CP2 each being generally semi-cylindrical in form and intended to be attached to each other in the closed position.

The fixing means MF may, for example, be in the form of annular circumferential clamping means MF disposed about the protector body CR, such as a collar (or a clamp or a hooping strip), and intended to radially displace the sealing element EE towards and into tight contact with the male end EM to immobilize the protector body CP and the sealing element EE with respect to the male end EM in the closed position.

As illustrated, the second sleeve EE may optionally comprise an external bulge (or protuberance) B1 which is at least partially annular, intended to be compressed by the first sleeve CP when the latter is immobilized by fixing means MF in the closed position. In this case, it is preferable for the first sleeve CP to include an internal recess L1 which is shallower (radially) than the (radial) thickness of the internal bulge B1. Said internal recess L1 is intended to partially house the internal bulge B1, radially compressing it between the first sleeve CP and the male end EM in the closed position.

It should be noted that the second sleeve (sealing element) EE may optionally be produced from a transparent material to allow the condition of the external threading FE1 of the male end EM to be checked when it remains fitted on the latter but when the first sleeve CP has been removed.

Device D is positioned as follows. Firstly, the second sleeve (sealing element) EE is freely fitted (open position of device D) in the XX direction, until its terminal portion P3 is in contact with the abutment surface of the terminal portion P1 of the male end EM. Next, the two portions CP1 and CP2 of the first sleeve (protector body) CP are placed on the second sleeve EE. An axial pressure is then exerted on the first CP and second EE sleeves until the terminal portion P3 is pressed against the abutment surface of the terminal portion P1 of the male end EM, and said two portions CP1 and CP2 are attached together with complementary attachment means. Finally, the first CP and second EE sleeves are immobilized with respect to the male end EM by tightening the fixing means MF on the two portions CP1 and CP2 of the first sleeve CP, downstream of the external threading FE1 of the male end EM, which radially displaces the second sleeve (or ring) EE towards the component T and defines the closed position of the device D. In this closed position, the second sleeve EE is in tight sealing contact (first seal) with the component downstream of the external threading FE1 (partly on the external sealing surface, partly on the body PC of the component T downstream of the transverse external abutment surface).

It will be understood that in the open position, the first sleeve CP then the second sleeve EE can easily be removed from the male end EM without damaging either the second sleeve EE or the external threading surface FE1 and in particular a layer of lubricant deposited permanently on that surface (they can then if necessary be freely re-fitted, as before). In contrast, in the closed position, device D is immobilized on the male end EM and can only be removed by freeing or loosening the collar MF for moving the device D into the open position.

Referring now to FIGS. 3A to 3C, we see a third embodiment of a device D of the invention, a variation of the second embodiment. In this third embodiment, the first sleeve (protector body) CP is a monobloc. It is, for example, in a generally frustoconical form of revolution.

The sealing element EE is produced in the form of a second sleeve, for example with an external generally frustoconical form of revolution and extending, once positioned on the male end EM, to its terminal portion P1. In this case, the first sleeve CP has an internal generally frustoconical form of revolution and is intended to be fitted in a tight manner on the second sleeve EE.

Preferably, and as shown, the second sleeve (sealing element) EE is terminated by a terminal portion P3 in the form of an inwardly extending flange and intended to be fit closely against the transverse annular end surface of the free terminal portion P1 of the male end EM (abutment surface) to form a (second) local seal over the entire circumference at that location. Further, it is intended to be interposed between the male end EM and the first sleeve CP over at least a portion of the axial length thereof.

In the example shown, the first sleeve CP integrally covers the second sleeve EE, and its terminal portion P2 forms an inwardly extending flange which will squash (or press) the terminal portion P3 of the second sleeve EE against the free terminal portion P1 of the male end EM.

It should be noted that in the open position, device D may be freely fitted on the male end EM.

The fixing means MF may, for example, be in the form of annular circumferential clamping means such as a collar (or a clamp or a hooping strip) intended to immobilize the first sleeve (protector body) CP and the second sleeve (sealing element) EE with respect to the male end EM downstream of its external threading FE1, in the closed position.

It should be noted that the second sleeve (sealing element) EE may optionally be produced from a transparent material to allow the condition of the external threading FE1 of the male end EM to be checked while it remains fitted on the latter but the first sleeve CP has been removed.

The device D may be positioned as follows. Firstly, the first CP and second EE sleeves are pre-assembled by tightly fitting until the terminal portion P2 of the first sleeve CP is in contact with the terminal portion P3 of the second sleeve EE. Next, the assembly constituted by the first sleeve (protector body) CP (not provided with fixing means MF or provided with loose fixing means MF) and the second sleeve (sealing element) EE is freely fitted (open position of the device D) in the direction XX onto the male end EM until the terminal portion P2 of the first sleeve CP squashes (or presses) the terminal portion P3 of the second sleeve EE against the transverse annular end surface of the free terminal portion P1 of the male end EM (abutment surface of the male end EM), which defines the open position of the device D. Finally, the first CP and second EE sleeves are immobilized with respect to the male end EM by tightening the fixing means MF on the first sleeve CP downstream of the external threading FE1 of the male end EM, which enables to radially displace the portion of the second sleeve EE located beneath the means MF towards the component T and to define the closed position of the device D. In this closed position, the second sleeve EE is in tight sealed contact (first seal) with the component T downstream of the external threading FE1 (and more particularly immediately downstream of the transverse annular external abutment surface).

It should be noted that in a variation, the second sleeve EE is initially slid onto the male end EM until its terminal portion P3 is in contact with the transverse annular end surface of the free terminal portion P1 of the male end EM (abutment surface of the male end). Next, the first sleeve CP is force fitted onto the second sleeve EE until its terminal portion P2 squashes (or presses) the terminal portion P3 of the second sleeve EE against the transverse annular end surface of the free terminal portion P1 of the male end EM, to define the open position of the device D.

It will be understood that in the open position, the assembly constituted by the first CP and second EE sleeves can be freely removed from the male end EM without damaging either the second sleeve EE or the external threading surface FE1 and in particular a layer of lubricant deposited permanently on said surface (this assembly can then if necessary be freely re-fitted, optionally in two steps). In contrast, in the closed position the device D is immobilized on the male end EM and can only be removed if the collar MF is released to move the device D into the open position.

Referring now to FIGS. 4A to 4C, we can see a fourth embodiment of a device D of the invention. In this fourth embodiment, the first sleeve (protector body) CP is a monobloc. It has a generally cylindrical form of revolution.

The sealing element EE is produced in the form of a ring comprising a central portion PC' intended to receive fixing means MF and is extended by a rim B2 with a generally frustoconical form of revolution.

This ring EE may be freely fitted in the open position of the device D on the male end EM downstream of its external threading FE1 (and even here partly on the body PC of the component T downstream of the transverse annular external abutment surface).

In this example, the ring (second sleeve) EE is generally disposed in the axial extension of the first sleeve CP.

The first sleeve (protector body) CP comprises two opposed terminal portions P2 and P4. Its first terminal portion P2 is in the form of an inwardly extending flange and intended to be pressed against the transverse annular end surface of the terminal portion P1 of the male end EM (abutment surface), forming a (second) local seal over the entire circumference at this location. The second terminal portion P4 is constituted by first SP1 and second SP2 sub-portions.

The first sub-portion SP1 has a generally frustoconical form of revolution. It is intended to be force fitted on the tapered rim B2 of the ring EE to attach the first sleeve CP and the ring EE. The first sub-portion SP1 and the tapered rim B2 thus constitute complementary fixing means.

The second sub-portion SP2 extends the first sub-portion SP1 in the direction of the terminal portion P2. It is provided with an internal threading FI1 intended to be screwed onto a selected portion of the external threading FE1 of the male end EM in the closed position. Said selected portion is in this case a sub-portion of the external threading FE1 which is located opposite to the free terminal portion P1 and which is formed by imperfect threads. Alternatively, it may be disposed on a sub-portion of perfect threads (located on the side of the free terminal portion P1).

The fixing means MF may, for example, be in the form of annular circumferential clamping means such as a collar (or a clamp or a hooping strip) to immobilize the second sleeve (sealing element) EE with respect to the male end EM downstream of its external threading FE1, in the closed position.

The first sleeve CP and the ring EE of the device D are preferably pre-assembled by tightly fitting their complementary fixing means (SP1, B2) before being placed on a male end EM. Said positioning may be carried out as follows. The assembly constituted by the protector body CP and the ring (sealing element) EE (not provided with fixing means MF or provided with fixing loose means MF) are freely fitted (open position of the device D) on the male end EM (in the direction XX defining the axis of the tube T) until the internal threading FI1 of the first sleeve CP engages on the external threading FE1 of the male end EM, then the internal threading FI1 is screwed onto the selected portion of the external threading FE1, so that the ring EE is substantially positioned downstream of the external threading FE1. Advantageously, screwing is carried out until the flange formed by the first terminal portion P2 is pressed against the transverse annular end surface of the terminal portion P1 of the male end EM producing a (second) local seal over the entire circumference at that location. Next, the ring EE is immobilized with respect to the male end EM by tightening the fixing means MF on the ring EE, which radially displaces the ring EE towards the component T and defines the closed position of the device D. In this position, the ring (second sleeve EE) is in tight sealed contact (first seal) with the component T downstream of the external threading FE1 (in this case downstream of the transverse annular external abutment surface).

It will be understood that in the closed position the protector body (first sleeve) CP can be removed from the male end EM leaving the ring EE in place simply by unscrewing the first sleeve CP without damaging either the ring EE or the external threading surface FE1 and in particular a permanent layer of lubricant deposited on that surface (the first sleeve CP can then be replaced if necessary). This enables in particular to check the condition of the external threading FE1 of the male end EM. In contrast, in the closed position, the device D is immobilized on the male end EM and can only be completely removed if the collar MF is removed so as to move the device D into the open position, then to unscrew the protector body CP.

FIGS. 5A to 5E describe a fifth embodiment of a device D of the invention. In this fifth embodiment, the first sleeve (protector body) CP is a monobloc. It has a generally frustoconical form of revolution. For example it comprises two opposed terminal portions P2 and P5. Its first terminal portion P2 extends to the terminal portion P1 of the male end EM and preferably forms an inwardly extending flange which is intended to be pressed against the transverse annular end surface of the terminal portion P1 of the male end EM (abutment surface). The second terminal portion P5 is intended to be placed above at least a portion of the sealing element EE, for example downstream of the external threading FE1 of the male end EM. The first sleeve CP also comprises an intermediate portion P6 provided with a first internal threading FI2 intended to be screwed onto a selected portion of the external threading FE1 of the male end EM in the closed position.

This selected portion is preferably located at the start of the perfect thread zone (sub-portion of the threading located on the free terminal portion P1 side of the male end EM). The imperfect threads often have sharp edges or burrs between the truncated peaks and flanks, which may damage the threads of the first sleeve CR, releasing debris which may spoil subsequent screw with a female end.

The sealing element EE is produced in the form of a ring comprising a principal portion intended to be at least partially interposed between the second terminal portion P5 of the first sleeve CP (over at least a part of the axial length of the second terminal portion P5) and the component T downstream of the external threading FE1 of the male end EM. Further, the principal portion is extended (on the side opposite to the terminal portion P2 of the first sleeve CP) by a first rim B3 split into tongues LA and intended to receive the fixing means MF.

The ring EE is capable, in the open position of the device D, of being freely fitted onto the male end EM to be positioned downstream of its external threading FE1.

The fixing means MF may, for example, be in the form of annular circumferential clamping means MF disposed about the protector body CP, such as a collar (or a clamp or a hooping strip) and intended to radially displace the sealing element EE, at the location of its tongues LA, towards and into contact with the male end EM and to immobilize the ring EE with respect to the male end EM downstream of its external threading FE1 in the closed position. In this closed position, the ring EE is in tight sealed contact (first seal) with the component T downstream of the external threading FE1.

The ring EE comprises an external threading FE2 in the portion intended to be placed beneath the first sleeve CP and the second terminal portion P5 of the first sleeve CP comprises a second internal threading FI3 intended to be screwed onto the external threading FE2 of the ring EE.

Further, as shown in FIG. 5E, the principal portion of the ring EE may optionally comprise an internal bulge (or protuberance) B4 which is at least partially annular and intended to be pressed against the component T, downstream of the external threading FE1 of the male end EM, by means MF as will be discussed below.

It should be noted that the first sleeve (protector body) CP is preferably screwed up on the ring EE before the device D is disposed on the male end EM (pre-assembly).

Once the protector body CP is screwed on the ring EE (not provided with fixing means MF or provided with loose fixing means MF), device D in the open position is freely fitted on the male end EM in direction XX, until the internal threading FI2 of the first sleeve CP engages on the external threading FE1 of the male end EM. Next, the first sleeve CP is rotated to screw its internal threading FI2 on the selected portion of the external threading FE1 so that the ring EE is substantially placed downstream of the external threading FE1 of the male end EM. Advantageously, to this end, screwing up is continued until the first terminal portion P2 of the first sleeve CP is pressed against the transverse annular end surface of the terminal portion P1 of the male end EM (abutment surface), producing a (second) local seal over the entire circumference at this location. Next, starting from that open position of the device D, the ring EE is immobilized with respect to the male end EM by tightening the fixing means MF on the ring EE, which radially displaces the ring EE towards the component T and defines the closed position of the device D. In this position, the second sleeve EE is in tight sealed contact (first seal) at the internal bulge B4 with the component T, downstream of the external threading FE1.

It will be understood that in the closed position the protector body (first sleeve) CP may be removed from the male end EM by simple rotation, then translation as shown in FIG. 5d, without damaging either the second sleeve EE or the surface of the external threading FE1 and in particular a layer of permanent lubricant deposited on said surface (the protector body CP may then be replaced if necessary). This allows the condition of the external threading FE1 of the male end EM to be checked. In contrast, in the closed position the device D is immobilized on the male end EM and can only be removed if the collar MF is removed to move the device D to the open position, then unscrewing the protector body CP.

FIGS. 6A to 6E describe a sixth embodiment of a device D of the invention, a variation of the fifth embodiment. In this sixth embodiment, the first sleeve (protector body) CP is a monobloc. As an example, it has a generally cylindrical form of revolution.

The sealing element EE is produced in the form of a second sleeve with a generally cylindrical form of revolution. Once in position, it extends to the terminal portion P1 of the male end EM. Preferably, and as shown, it is terminated by a terminal portion P3 in the form of an inwardly extending flange and intended to cover and to be pressed closely against the transverse annular end surface of the free terminal portion P1 of the male end EM (abutment surface) to form a (second) local seal over the entire circumference at that location. It is also intended to be interposed between the male end EM and the first sleeve CP over at least a portion of the axial length thereof.

In the example shown, the first sleeve CP entirely covers the second sleeve EE, and its terminal portion P2 in the form of an inwardly extending flange squashes (or presses) the flange at the terminal portion P3 of the second sleeve EE against the transverse annular surface of the free terminal portion P1 of the male end EM in the closed position.

The second sleeve EE comprises a first intermediate portion P7 intended to be placed downstream of the external threading FE1 of the male end EM and provided with an external threading FE3, and an end portion P8 which extends the intermediate portion P7 (on the side opposite to the terminal portion P2 of the first sleeve CP), is split into tongues LA and is intended to receive the fixing means MF.

It should be noted that the second sleeve (sealing element) EE may optionally be produced from a transparent material to allow the condition of the external threading FE1 of the male end EM to be checked, while it remains immobilized on the latter (device D in closed position) but the first sleeve CP has been removed.

The first sleeve CP comprises two opposed terminal portions P2 and P5. Its first terminal portion P2 extends to the free terminal portion P1 of the male end EM and here is in the form of an inwardly extending flange and intended to be pressed against the terminal portion P3, also in the form of an inwardly extending flange of the second sleeve EE, in order to squash it against the abutment surface of the terminal portion P1 of the male end EM, producing a (second) local seal over the entire circumference at that location. The second terminal portion P5 is intended to be placed above the sealing element EE downstream of the external threading FE1 of the male end EM. It comprises an internal threading FI4 intended to be screwed onto the external threading FE3 of the second sleeve EE, after placing it on the male end EM.

The fixing means MF may, for example, be in the form of circumferential annular clamping means MF such as a collar (or a clamp or a hooping strip) for radially displacing the second sleeve EE (at its tongues LA) towards the male end EM and for immobilizing it with respect to the male end EM downstream of its external threading FE1 in the closed position. The second sleeve EE comprises a second intermediate portion P9 provided with an internal threading FI5 intended to be screwed onto a selected portion of the external threading FE1 of the male end EM, in the closed position. This selected portion is preferably located at the start of the perfect thread zones for the reasons mentioned above when discussing the fifth embodiment.

Figure 6A:
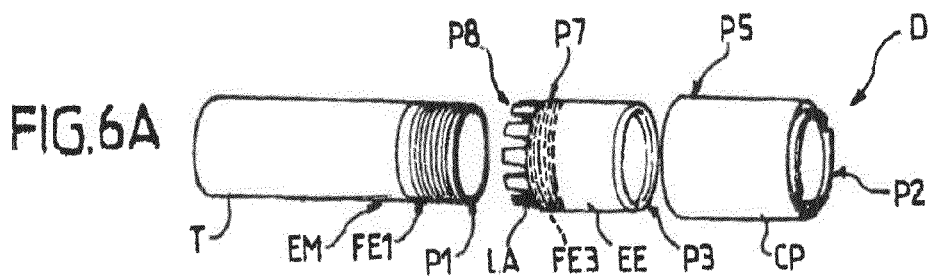
Figure 6B:
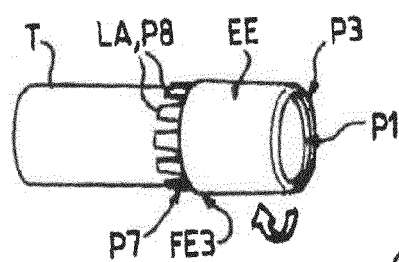
Figure 6C:
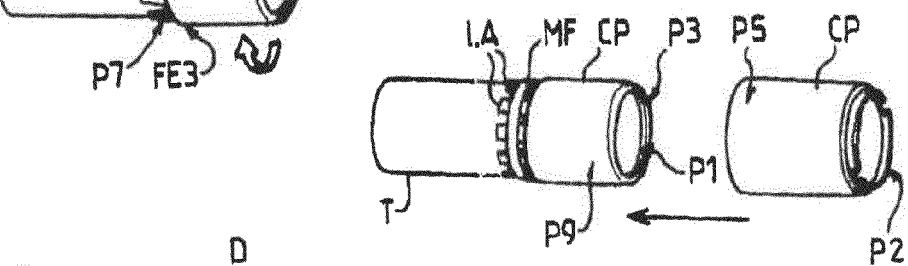
Figure 6D:
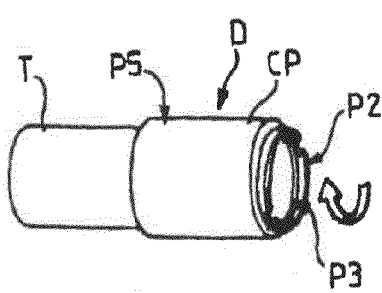
Figure 6E:
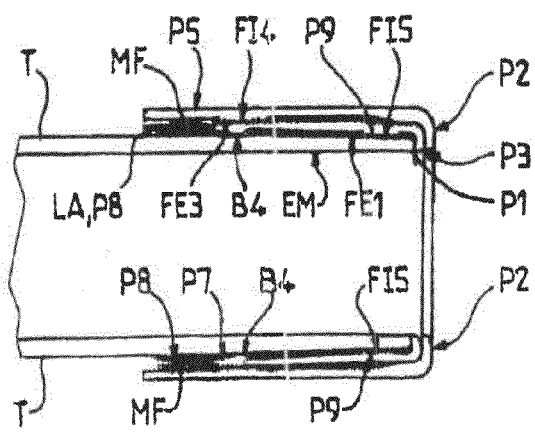

Further, as illustrated in FIG. 6E, the first intermediate portion of the second sleeve may optionally comprise an internal annular bulge (or protuberance) B4 intended to be compressed against the male end EM downstream of the external threading FE1 thereof, via fixing means MF in the closed position to constitute the first seal.

Device D is positioned as follows. Firstly, the second sleeve EE (not provided with fixing means MF or provided with loose fixing means MF) is freely fitted on the male end EM in the direction XX until the internal threading FI5 of its intermediate portion P6 engages on the external threading FE1 of the male end EM, then said internal threading FI5 is screwed onto the external threading FE1 until the flange at the terminal portion P3 of the second sleeve EE is pressed against the abutment surface of the terminal portion P1 of the male end EM. Next, starting from this (open) position of the device D, the second sleeve EE is immobilized with respect to the male end EM by tightening the fixing means MF on the tongues LA of the portion P8 of the second sleeve EE (closed position of the device D). In this closed position, the second sleeve FE is in tight sealed contact (first seal) with the component T downstream of the external threading FE1 at the bulge B4. Next, the first sleeve (protector body) CP is fitted in the direction XX on the second sleeve EE, until the internal threading FI4 of the second terminal portion P5 engages on the external threading FE3 of the second sleeve EE. Next, the first sleeve CP is rotated in order to screw its internal threading FI4 onto the external threading FE3, until the flange of its first terminal portion P2 presses (or squashes) the terminal portion P3 of the second sleeve EE. If the internal threading FI4 and external threading FE3 interfere radially, they may increase squashing of the internal bulge B4 against the component T and thus improve the first seal. Advantageously, the internal FI4 and external FE3 threadings are positioned on the internal bulge B4.

It will be understood that in the closed position, the protector body (first sleeve) CP can be removed from the male end EM simply by unscrewing the internal threading FI4 and external threading FE3 without damaging either the second sleeve EE or the surface of the external threading FE1 and in particular a layer of lubricant permanently deposited on said surface (the protector body CP may then be replaced if necessary). This can in particular allow the condition of the external threading FE1 of the male end EM to be checked. In contrast, in the closed position, the second sleeve EE is immobilized on the male end EM and can only be removed by at least partially unscrewing the protector body CP then removing the collar MF to move the device D into the open position.

FIGS. 7A to 7C describe a seventh embodiment of a device D of the invention. In this seventh embodiment, the first sleeve (protector body) CP is monobloc. It comprises two opposed terminal portions P2 and P5. Its first terminal portion P2 extends to the free terminal portion P1 of the male end EM and preferably forms an inwardly extending flange which is intended to be pressed against the transverse annular end surface of the terminal portion P1 of the male end EM (abutment surface). The second terminal portion P5 generally has a cylindrical form of revolution, for example. In the open position of the device D, it is intended to be freely fitted on the male end EM downstream of its external threading FE1 and to receive the fixing means MF.

The first sleeve CP also comprises an intermediate portion P10, with a generally frustoconical form of revolution, for example. This comprises first P11 and second P12 distant sub-portions. The first sub-portion P11 defines a recess LO intended to receive the sealing element EE before the first sleeve CP is placed on the male end EM (pre-assembly) and to place it downstream of the external threading FE1 of the male end EM.

The sealing element FE is produced in the form of a ring intended to be attached to the first sleeve CP, for example by clip fitting, inside the recess LO defined by the first sub-portion P11 of its intermediate portion P10, so as to be at least partially interposed between said first sleeve CP and the component T downstream of the external threading FE1.

The fixing means MF may, for example, be in the form of annular circumferential clamping means which in this case are a bolt BL (or equivalent means) which is suitable to cooperate with the terminal portion P5. The bolt BL is intended to radially displace the second terminal portion P5 of the first sleeve CP towards the male end EM and to immobilize it with respect to the male end EM downstream of its external threading FE1 in the closed position.

The second terminal portion P5 of the first sleeve CP may comprise at least one axial opening OA partially surrounded by two tabs placed facing each other and each provided with a hole. Two or more axial openings OA may be envisaged distributed about the periphery of the terminal portion P5 and the same number of bolts BL. The (or each) bolt BL, intended to be introduced into the facing holes of the tabs, may be screwed up using its nut EC in order to close the rims of the corresponding axial opening OA, radially displacing the second terminal portion P5 of the first sleeve CP towards the component T and immobilizing it with respect to the male end EM downstream of its external threading FE1 in the closed position. It should be noted that in this closed position, the fixing means MF radially compress the second sleeve EE between the recess LO and the component T downstream of its external threading FE1.

The second sub-portion P12 of the intermediate portion P10 of the first sleeve CP is provided with an internal threading FI6 intended to be screwed onto a selected portion of the external threading FE1 of the male end EM, in the closed position. This selected portion is preferably located at the start of the zone of perfect threads for the reasons given above concerning the fifth and sixth embodiments.

The first sleeve CP and the ring EE of the device D are preferably pre-assembled (clip fitting the ring EE in the recess LO) before being placed on a male end EM. Positioning may be carried out as follows. The assembly constituted by the protector body (first sleeve) CP (not provided with fixing means MF or provided with loose fixing means MF) and the ring (sealing element) EE are fitted (translated) (open position of device D) on the male end EM (in the direction XX defining the axis of the tube T) until the internal threading FI6 of its intermediate portion P10 engages on the external threading FE1 of the male end EM. Next, the protector body CP is rotated in order to screw its internal threading FI6 on the external threading FE1 (its second terminal portion P5 is then fitted on the male end EM) until the flange of its first terminal portion P2 is pressed against the transverse annular end surface of the terminal portion P1 of the male end EM (abutment surface. Next, the terminal portion P5 of the protector body CP is radially displaced towards the male end EM, tightening the fixing means MF (BL, EC) which radially displaces the recess LO towards the component T and defines the closed position of the device D. In the closed position, the fixing means MF radially compress the ring EE between the recess LO and the component T downstream of the external threading FE1, which produces the first seal.

It will be understood that in the open position, the protector body (first sleeve) CP and the sealing element EE can be removed from the male end EM by unscrewing the protector body CP without damaging either the ring EE or the surface of the external threading FE1 and especially a permanently deposited layer of lubricant on that surface (the assembly constituted by the protector body CP and the ring EE may then be replaced if necessary). This allows the condition of the external threading FE1 of the male end EM to be checked.

In contrast, in the closed position, the device D is immobilized on the male end EM and can only be removed if the fixing means MF are released to move the device D into the open position, then the protector body CP is unscrewed.

Referring now to FIGS. 8A to 8E, we describe an eighth embodiment of a device D of the invention, a variation of the seventh embodiment. The difference between this eighth embodiment and the seventh lies on the one hand in the form of the second terminal portion P5 of the protector body CP and on the other hand in the type and mode of action of the fixing means MF. The second terminal portion P5 is in this case split axially into tongues LA as in the fifth and sixth embodiments of the invention. The fixing means MF are in this case in the form of a nut MF intended to be positioned without being screwed onto the second terminal portion P5 of the first sleeve CP before placing it on the male end EM. Said nut MF comprises an internal threading intended to be screwed in a radially interference fitting manner onto an external threading FE4 defined on the second terminal portion P5 of the first sleeve CP, in order to radially displace said second terminal portion P5 towards the component T at the location of the tongues LA and to immobilize the assembly constituted by the protector body CP and the ring EE with respect to the male end EM downstream of its external threading FE1 in the closed position. As an example, the external threading FE4 may be tapered with the largest diameter disposed on the free end side of the second terminal portion P5, and its diameter may be greater than that of the threading of the nut MF over at least a portion of the axial length of the external threading FE4.

Device D is thus entirely pre-assembled in the open position before being placed on the male end EM of the tube F, as shown in FIGS. 8A to 8D. The open position of the device D is defined by the axial position of the nut MF at the end of the external threading FE4 located to the side of the first terminal portion P2 (small diameter of the external threading FE4; no radial interference fit of the nut MF on the external threading FE4), as shown in FIG. 8B.

The device D may be positioned as follows. Firstly, the pre-assembled device D is fitted (translated) in the direction XX until the internal threading FI6 of the intermediate portion P10 of the protector body CP engages on the external threading FE1 of the male end EM. Next, the protector body CP is rotated in order to screw its internal threading FI6 onto the external threading FE1 so that the ring EE is substantially placed downstream of the external threading FE1 of the male end EM. Advantageously, to this end screwing is continued until the flange of the first terminal portion P2 is pressed against the transverse annular end surface of the terminal portion P1 of the male end EM (abutment surface) (see FIGS. 8C and 8E). Next, the assembly constituted by the protector body CP (at its second terminal portion P5) and the ring EE are immobilized with respect to the male end EM by screwing the screw (fixing means) MF onto the external threading FE4 of the second terminal portion P5 of the protector body CP in order to displace the nut MF towards the free end of the second terminal portion P5, which radially displaces the recess LO towards the component T and defines the closed position of the device D (illustrated in FIG. 8D). The ring EE is then radially compressed between the recess LO and the component T downstream of the external threading FE1, producing the first seal.

It will be understood that in the open position, the device D can be removed from the male end EM by unscrewing it without damaging either the ring EE or the surface of the external threading FE1 and in particular a layer of lubricant deposited permanently on that surface (the device D may then be replaced if necessary). In contrast, in the closed position the device D is immobilized on the male end EM and can only be removed by unscrewing the nut MF, displacing it on the external threading FE4 towards the first terminal portion P2 in order to move the device D into the open position, then unscrewing the complete device D from the male end EM.

We shall now refer to FIGS. 9A to 9F to describe a ninth embodiment of the device D of the invention, which is a variation of the sixth embodiment. The ninth embodiment differs from the sixth embodiment in the form and mode of cooperation of the sealing element EE with the fixing means MF. Here, the sealing element EE is advantageously in the form of a second transparent sleeve.

Said second sleeve EE comprises two portions P13 and P14. The first portion P13 has a generally frustoconical form of revolution, for example. It is intended, once placed on the male end EM, to extend to the terminal portion P1 of the male end EM, terminating in a terminal portion P3. Preferably, and as shown, the terminal portion P3 is in the form of an inwardly extending flange and is intended to be pressed closely against the transverse annular end surface of the free terminal portion P1 of the male end EM (abutment surface) producing a (second) local seal over the entire circumference at that location. It is also intended to be interposed between the male end EM and the first sleeve CP. The first portion P13 comprises a sub-portion P15 provided with an external threading FE5 and preferably, it is intended to be placed downstream of the external threading FE1 of the male end EM.

The second portion P14 extends the first portion P13 in the direction opposite to the terminal portion P3. It has a generally slightly tapered external form of revolution (large diameters on the side of its free end) and is intended to receive the fixing means MF. It is preferably split into tongues (LA), as in the fifth, sixth and eighth embodiments.

The fixing means MF may, for example, be in the form of annular circumferential clamping means MF such as a ring or a nut and intended to be placed on the second portion P14 of the second sleeve EE in the open position. Said fixing means MF are arranged in the case of an axial displacement along the tongues LA towards a free end thereof and in cooperation with said tongues LA, to radially displace them towards the male end EM, and to immobilize the second sleeve EE with respect to the male end EM downstream of its external threading FE1 in the closed position.

In a variation illustrated in FIGS. 9A to 9F, the fixing means MF are in the form of a nut. The second portion P14 of the second sleeve EE then comprises a tapered external threading FE6 (large diameters on the side of the free end of the second portion P14) on which the nut MF may be placed in the open position, then onto which the internal threading of the nut MF may be screwed in a progressively radially tightening manner (axially displacing the nut MF towards the large diameters of the external threading FE6) in order to radially displace the second sleeve EE towards the component T and to immobilize it on the male end EM downstream of its external threading FE1 in the closed position.

The protector body CP is in the form of a first sleeve, for example with a generally frustoconical form of revolution. It comprises two opposed terminal portions P2 and P16. Its first terminal portion P2 extends to the free terminal portion P1 of the male end EM and preferably forms an inwardly extending flange which is intended to be pressed against the terminal portion P3 of the second sleeve EE in order to squash it against the transverse annular end surface of the terminal portion P1 of the male end EM (abutment surface). The second terminal portion P16 is intended to be positioned above the sub-portion P15 of the sealing element EE. It comprises an internal threading FI7 intended to be screwed on the external threading FE5 of the sub-portion P15 of the second sleeve EE.

Figure 9A:
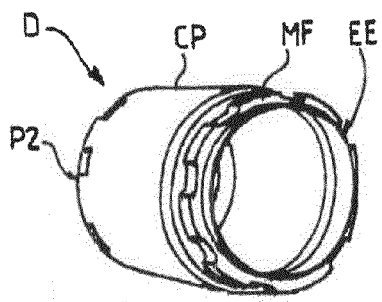
Figure 9B:
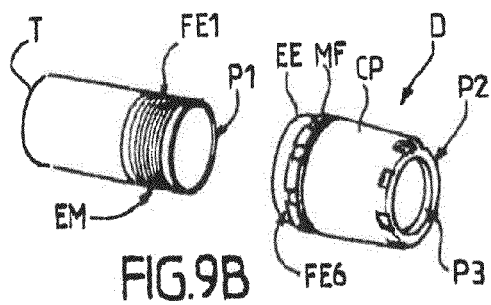
Figure 9C:
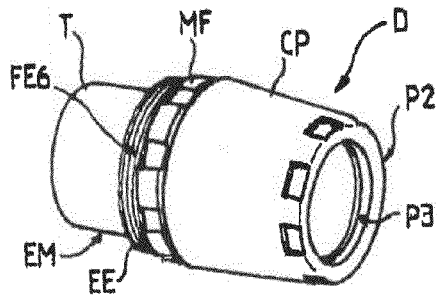
Figure 9D:
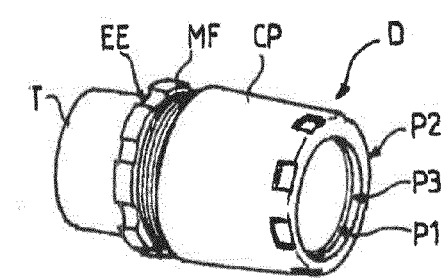
Figure 9E:
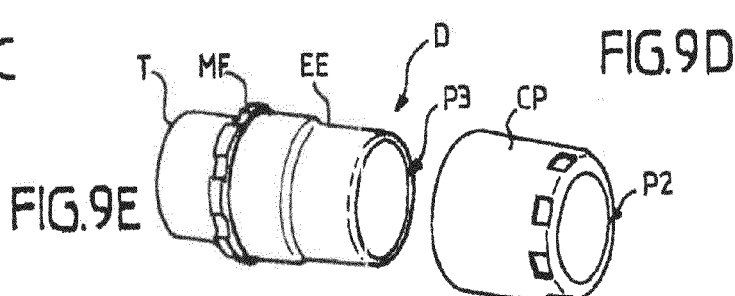
Figure 9F:
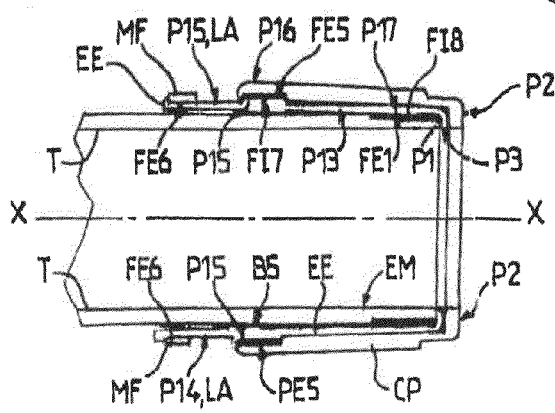

As can be seen in FIG. 9F, the second sleeve EE comprises, at its first portion P13 (intermediate portion between P3 and P14), a sub-portion P17 provided with an internal threading FI8 intended to be screwed onto a selected portion of the external threading FE1 of the male end EM, in the closed position. This selected portion is preferably located at the start of the perfect thread zone for the reasons mentioned above pertaining to the fifth to eighth embodiments.

Further, as shown in FIG. 9F, the sub-portion P15 of the second sleeve EE may optionally comprise an internal bulge (or protuberance) B5 which is at least partially annular and intended to be radially compressed against the male end EM in the closed position.

It should be noted that the protector body CP is preferably screwed onto the second sleeve EE, for example up to the point at which the flange P2 is in contact with the flange P3, before the device D is disposed on the male end EM. The nut MF is positioned on the external threading FE6 on the small diameter threading side (on the side of the first portion P13) and thus defines an open position of the device D.

Once the protector body CP has been screwed onto the second sleeve EE and the nut MF has been placed (but not tightened), the device D is fitted in this open position on the male end EM in the direction XX, until the internal threading FI8 of the second sleeve EE engages on the external threading FE1 of the male end EM. Next, the protector body CP is rotated in order to screw the internal threading FI8 onto the external threading FE1 (the second portion P14 of the second sleeve EE is thus fitted on the male end EM) so that the second portion P14 and the sub-portion P15 of the second sleeve EE are placed substantially downstream of the external threading FE1 of the male end EM. Advantageously, to this end, the second sleeve EE is screwed up until its first terminal portion P3 is pressed against the transverse annular end surface of the terminal portion P1 of the male end EM (abutment surface). Next, the second sleeve EE is immobilized with respect to the male end EM by screwing the screw (fixing means) MF onto the external threading FE6 of its second portion P14 towards the increasing diameters of the external threading FE6, which defines the closed position of the device D (shown in FIGS. 9D and 9E). In this position, the second sleeve EE is in tight sealed contact (first seal) at least at the internal bulge B5 with the component T downstream of the external threading FE1.

Advantageously, the free end of the second portion P14 of the second sleeve EE has an external swelling forming an axial abutment to limit the axial course of the nut towards said free end and prevent it from leaving the external threading FE6 when in the closed position.

It will be understood that in the closed position, the protector body CP of the male end EM can be removed by unscrewing it without damaging either the second sleeve EE or the surface of the external threading FE1 and in particular a layer of lubricant permanently deposited on that surface (the protector body CP may then be replaced if necessary). In contrast, in the closed position, the device D is immobilized on the male end EM and can only be removed by unscrewing the nut MF (towards the first portion P13) to move the device D into the open position, then to unscrew the assembly constituted by the protector body CP and the second sleeve EE of the male end EM.

In a variation which is not shown, the nut MF may be replaced by an internally smooth ring and the second portion P14 of the second sleeve EE may be tapered and not threaded.

Instead of screwing up or unscrewing the nut MF, the smooth tapered ring should be thrusted axially from one end to the other of the second portion P14 so that the ring will tighten or loosen the tongues LA of the second portion P14. Such a variation using a smooth tapered ring may also be employed in place of the nut MF in the eighth embodiment of the invention.

We shall refer now to FIGS. 10 to 18 to discuss a tenth embodiment of a device D of the invention. The differences between the tenth and ninth embodiments lie in the form of the sealing element EE and the mode of cooperation of the fixing means MF with the sealing element EE. The sealing element EE is in the form of a ring attached, for example by clip fitting, to the protector body (first sleeve) CP.

This ring EE is deformable and comprises a central portion P40 located between the first P19 and second P23 ends.

Preferably, to allow its radial deformation by buckling, the deformable ring EE has an axial length between 4 times and 40 times its radial thickness. As an example, the ring EE may have a radial thickness of the order of 1.5 mm to 5 mm and an axial length of the order of 20 mm to 60 mm. Too short an axial length and/or too great a radial thickness would not encourage large radial deformation. Too small a radial thickness and/or too long an axial length would not encourage a sufficiently tight fit of the ring EE on the component T.

Preferably again, the central portion P40 of the deformable ring EE has a smaller diameter than its ends P19 and P23, to orientate the direction of its radial deformation (see FIGS. 15 and 18).

The first sleeve CP has, for example, a generally cylindrical form of revolution. It comprises opposed first P2 and second P18 terminal portions. Its first terminal portion P2 extends to the free terminal portion P1 of the male end EM and preferably forms an inwardly extending flange and intended to be pressed against the terminal portion P1 of the second sleeve EE to squash it against the transverse annular end surface of the male end EM.

The second terminal portion P18 is intended to receive a first end P19 of the ring EE in order to place it downstream of the external threading FE1 of the male end EM. In the extension of the second terminal portion P18 is also a first intermediate portion P20, which is provided with an external threading FE7.

The fixing means MF are in the form of a nut comprising first P21 and second P22 portions. The first portion P21 is intended to receive the second end P23 of the ring EE. The second portion P22 is provided with an internal threading FI9 intended to be fixed to the external threading FE7 of the first intermediate portion P20 of the first sleeve CP in order to allow axial displacement of the nut MF on the external threading FE7 of the first sleeve CP. Said axial displacement is intended to exert an axial compressive force on the first P19 and second P23 ends of the ring EE directed towards its central portion P40 so as to buckle the ring EE and flex its central portion P40, pressing it against the component T downstream of its external threading FE1 in the closed position. Examples of the configuration of the first P21 and second P22 portions can be seen in FIG. 18. More precisely, the second portion P22 defines, for example, a circular groove GC in which the second end P23 of the ring EE is placed, once the device D has been pre-assembled.

As can be seen in FIG. 11, the first end P19 of the ring EE comprises, for example, radial projections SR intended to be introduced into openings OV produced in the second terminal portion P18 of the first sleeve CP. The ring EE may then be attached by clip fitting to the second terminal portion P18 of the first sleeve CP, as shown in FIG. 13.

Next, the nut MF can be attached to the first sleeve CP by engaging at least one thread of its internal threading FI9 in the external threading FE7 of the first sleeve CP. This may be carried out by screwing or by clip fitting. To provide such clip fitting, for example, an external threading FE7 and/or an internal threading FI9 with a saw tooth profile of the type shown diagrammatically in FIG. 16 may be used. In this non limiting example, the thread profile has two flanks with different inclinations with respect to the axis XX of the device D. The angle of the most inclined flank is less than or equal to three times the complement to 90 degrees of the angle of the less inclined flank (i.e. a gentle first slope (defined by angle B) and a steep second slope (defined by angle A)). As an example, B is selected to be 2.5 A.

It will be seen from FIGS. 15 and 18 that when nut MF is screwed onto the protector body CP in the direction of the terminal portion P2 (arrow F1), an axial stress (compression) is exerted on the second end P23 of the ring EE, and thus its central portion P40 is constrained to flex internally in the direction of the external wall of the component T (arrow F2) and thus to become radially pressed by bending against the external wall of the component downstream of the external threading FE1 in the closed position.

The protector body CP also comprises a second intermediate portion P24 comprising an internal threading FI10 intended to be screwed onto a selected portion of the external threading FE1 of the male end EM, preferably on a sub-portion of the threading FE1 with perfect threads (for the reasons mentioned above with regard to the fifth to ninth embodiments).

It will be noted, as illustrated in FIG. 18, that the first sleeve CP may optionally comprise an external shoulder (or protuberance) B6 defining an axial abutment for the nut MF.

Firstly, the device D is pre-assembled in the open position: the ring EE is clip fitted onto the terminal portion P18 of the protector body CP and engaged in the groove GC of the nut MF the internal threading FI9 of which is engaged on the end of the external threading FE7 of the protector body CP on the side of its terminal portion P18.

Device D may be positioned as follows. Firstly, the pre-assembled device D is fitted (translated) in the open position in the direction XX (FIG. 17A) until the internal threading FI10 of the intermediate portion P24 of the protector body CP engages on the external threading FE1 of the male end EM. Next, the protector body CP is rotated in order to screw its internal threading FI10 onto the external threading FE1 so that the ring EE is substantially positioned downstream of the external threading FE1 of the male end EM. Advantageously, to this end the protector body CP is screwed up until the flange of its first terminal portion P2 is pressed against the transverse annular end surface of the terminal portion P1 of the male end EM (abutment surface), as shown in FIG. 17B. Then, the protector body CP is immobilized with respect to the male end EM by screwing the nut (fixing means) MF onto the external threading FE7 of the first intermediate portion P20 of the protector body CP in the direction of the terminal portion P2 to a selected position to define the closed position of the device D (shown in FIG. 17C).

It will be understood that in the open position, the device D can be removed from the male end EM by unscrewing it without damaging either the ring EE or the surface of the external threading FE1, and in particular a layer of lubricant deposited permanently on that surface (device D may then be replaced if necessary). In contrast, in the closed position the device D is immobilized on the male end EM and can only be removed by unscrewing the nut MF completely, to move the device D into the open position, then to unscrew the protector body CP of the male end EM.

This arrangement of the device D in this tenth embodiment allows the central portion P40 of the ring EE to be displaced radially by a large amount (of the order of one to a few millimeters), allowing the dimensional variations permitted for the component T and its male end EM to be accommodated without damaging the ring EE or the surface of the external threading FE1 during positioning or removal of the device D in the open position, while ensuring excellent immobilization of the device D and an excellent first seal in the closed position.

FIG. 19 shows an eleventh embodiment of a device D of the invention, a variation of the tenth embodiment. This eleventh embodiment differs from the tenth in the mode of attaching the fixing means MF to the protector body CP. Attachment is carried out via a fixing element EF.

More precisely, the first sleeve CP (which is, for example, of a generally cylindrical form of revolution) comprises a second terminal portion P25 opposite to its first terminal portion P2, intended to receive the first end P19 of the ring EE to place it downstream of the external threading FE1 of the male end EM, and comprising a first external shoulder (or protuberance) B7 which defines an axial abutment.

The first sleeve CP also comprises a first intermediate portion P26 which comprises a second external protuberance B8 defining an axial anti-return abutment of a selected form for the fixing element EF and located at a selected distance from the first external abutment B7 as a function of the axial extension of the fixing element EF. As shown, it may optionally comprise a third abutment B9 at a selected distance from the second external protuberance B8 and with a radial extent which is substantially greater than that of the second external protuberance B8 in order to force the soft element EF to trap the second external protuberance B8 in a homologous recess LR.

It should be noted that the second external protuberance B8 may optionally have a dissymmetric profile with a relatively less inclined flank and an abrupt flank.

The fixing element EF has, for example, a generally cylindrical form of revolution. It comprises an internal recess LR the form of which is homologous with that of the second external protuberance B8, as well as an external threading FE8. It is intended to be initially placed between the first external shoulder B7 and the second external protuberance B8 before the device D is placed on the male end EM in the open position.

Further, the nut (fixing means) MF still comprises a portion P21 in which is defined the circular groove GC intended to receive the second end P23 of the ring EE, as well as a second portion P22 provided with an internal threading FI11 intended to be screwed onto the external threading FE8 of the fixing element EF before the device D is placed on the male end EM in the open position.

The nut MF may be axially displaced towards the third abutment B9 by thrusting on its free end front face, driving the fixing element EF so that in the closed position the second external protuberance B8 (of the protector body CP) is locked inside its recess LR, thus prohibiting axial displacement of the fixing element EF in the reverse direction, and flexing the ring EE to press it against the component T downstream of the external threading FE1. The protector body CP is then immobilized with respect to the male end EM in the closed position and the ring EE is squashed in sealed tight contact (first seal) against the external wall of the component T downstream of the external threading FE1.

The internal threading FI11 of the nut MF and the external threading FE8 of the fixing element EF may optionally cooperate together in order to allow the nut MF to be unscrewed. This allows the device D to move from a closed position to an open position for its removal from the male end EM, and if required to screw up the nut MF again so that the device D can return to the closed position once the device D has been replaced on the male end.

As indicated above, in several of its embodiments, the device D may be placed on a male end EM using a first machine adapted for this purpose.

The invention also encompasses a first method for automatically positioning at least a ninth or tenth embodiment of the protective device D on the male end EM of a component T of a threaded tubular connection.

This first method consists of pre-assembling the protector body CP, nut MF and the ring EE in the open position then screwing the device D so constituted until the protector body CP is applied against the transverse annular end surface of the free terminal portion P1 of the male end EM to produce a second seal, and finally to screw the nut MF to define the closed position of the device D and the first seal.

Said first method may be implemented using a first machine M1. Said first machine M1 comprises a holding means MM for holding the male end EM, a first screw means MV1 for screwing the protector body CP on the male end EM, a detection means MD for detecting contact of the protective body CP against the transverse annular end surface of the free terminal portion P1 of the male end EM and to stop the first screw means MV1 when contact is detected, and a second screw means MV2 for screwing up the nut MF to a selected position to define the closed position of device D.

The screw means MV1, MV2 may, for example, be sets of jaws coupled to electric or hydraulic motors. The detection means MD may, for example, be a travel end contact or, as is preferable, a means for measuring the torque of the screw means MV1. The selected position may, for example, be determined by a travel end contact or by a threshold on a means for measuring the torque of the second screw means MV2.

The invention may also encompass a second method for automatically positioning at least a tenth or eleventh embodiment of the protective device D on the male end of a component of a threaded tubular connection.

Said second method consists of pre-assembling the protector body CP, the nut MF, optionally the fixing element EF and the ring EE in the open position, then screwing the device D up until the protector body CP is applied against the transverse annular end surface of the free terminal portion P1 of the male end EM to produce a second seal, and axially thrusting the nut MF to a selected position to flex the ring EE and thus define the closed position of the device D and the first seal.

In this second method, the selected position may result from the nut MF bearing against the external shoulder B6 of the protector body Cp.

In this second method, when the device D comprises a fixing element EF, the selected position may, for example, be that in which the second external protuberance B8 of the protector body CP is locked in the recess LR of the fixing element EF.

This second method may be carried out using a second machine M2. Said second machine M2 comprises a holding means MM' for holding the male end EM, a screwing means MV for screwing the protector body CP onto the male end EM, a detection means MD' for detecting contact of the protector body CP against the transverse annular end surface of the free terminal portion P1 of the male end EM and to stop the screw means MV when contact is detected, and an axial thrust means MPA to thrust the nut MF axially to a selected position to define the closed position of the device D.

The screw means MV may, for example, be a set of jaws coupled to an electric or hydraulic motor. The axial thrust means may, for example, be a screw jack. The detection means MD may, for example, be a travel end contact or, as is preferable, a means for measuring the torque of the screw means MV.

The selected position may, for example, be determined by a travel end contact or by a threshold on a means for measuring the axial thrust force.

The invention may also encompass a third method for inspecting the male end EM of a component of a threaded tubular connection when that end is provided with at least one of the embodiments of the protective device D described above (in particular the first, third to sixth and ninth).

This third method consists of detaching the protector body CP from the sealing element EE then removing the protector body CP from the male end EM leaving the sealing element EE in position, then inspecting the male end EM, then replacing the protector body CP on the male end EM, and again attaching the protector body CP to the sealing element EE.

The invention is not limited to the embodiments of the protective device described above, which are given solely by way of example, but it encompasses all variations which the skilled person could envisage, as defined in the accompanying claims.

Thus, the invention also concerns types of male ends other than those described above. As an example, the first to fourth embodiments may be applied to a male end for a threaded and coupled tubular connection (of the VAM TOP type) and the fifth to eleventh embodiments may be applied to a male end of a flush threaded tubular connection (VAM FJL type). The invention also concerns male ends of threaded tubular connections termed "semi flush" connections which have a small diameter difference between the male and female ends, such as VAM SLIJ II connections (described in EP 0 767 335), which comprise two tapered threaded portions disposed in two distinct stages and separated by a central abutment, each threaded portion comprising a sub-portion with perfect threads between two sub-portions of vanishing threads, and two metal/metal sealing surfaces, one upstream of the threaded portions, and the other downstream.

In the case in which the male end has elements downstream of the threaded portions (abutment surface, sealing surface), the first seal is preferably produced on a regular section (or body) of the component beyond any threaded male end element.

In the case of a threaded tubular connection without an abutment in the terminal portion of the male end, in particular if the free terminal portion does not have a transverse annular surface of sufficient width, the second seal may be produced, in a variation, upstream of the threading and, if appropriate, upstream of the metal/metal sealing surface.

The invention claimed is:

1. A protective device for a male end of a component of a threaded tubular connection for drilling and working hydrocarbon wells, externally provided with at least one threading and including a free terminal portion, said device comprising:
   i) a protector body produced in a form of a first sleeve and arranged to protect at least part of said external threading and said free terminal portion;
   ii) a sealing element configured to be positioned in contact firstly with said component, at least at a portion located downstream of said external threading of the male end, and secondly with the protector body, so as to provide a first seal downstream of said external threading; and iii) fixing means for displacing said sealing element and/or said protector body radially towards said component defining open and closed positions of the device in which the sealing element and/or the protector body are respectively not in contact and in tight contact with said component, and wherein the first seal is obtained in the closed position of said device, wherein said sealing element is produced in a form of a second sleeve, wherein said second sleeve is configured to be interposed between said male end and said first sleeve over at least a portion of an axial length of said first sleeve, and wherein said fixing means comprises a circumferential clamping means disposed about the protector body and arranged to radially displace said sealing element towards and into contact with said component and to immobilize said protector body and said sealing element with respect to said male end in the closed position.

2. A device according to claim 1, wherein said second sleeve is produced from a transparent material.

3. A protective device according to claim 1, wherein said second sleeve is generally disposed in the axial extension of the first sleeve, and complementary fixing means is arranged on the protector body and on the sealing element to attach said protector body and said sealing element together.

4. A protective device according to claim 1, wherein said second sleeve extends to cover a transverse annular end surface of the terminal portion of the male end.

5. A protective device according to claim 1, wherein said second sleeve comprises an external bulge which is at least partially annular cooperating with a recess of said first sleeve and arranged to be radially compressed between said first sleeve and said male end in the closed position.

6. A protective device according to claim 1, wherein said first sleeve includes two complementary portions arranged so as to be fixed to each other in the closed position.

7. A device according to claim 1, wherein said sealing element has a generally external frustoconical form of revolution, and said first sleeve has a generally internal frustoconical form of revolution which can be fitted in a tight manner on said sealing element.

8. A protective device for a male end of a component of a threaded tubular connection for drilling and working hydrocarbon wells, said component being externally provided with at least one external threading and including a free terminal portion, said device comprising:

i) a first circumferential sleeve arranged to protect said external threading and said free terminal portion;

ii) a sealing element configured to be positioned between said component and said first circumferential sleeve, in contact with a portion of said component located opposite to said free terminal portion with respect to said external threading of said male end, so as to provide a first sealing contact zone opposite to said free terminal portion with respect to said external threading of said male end; and iii) a circumferential clamp for tightly securing said first circumferential sleeve, said sealing element and said component together, by application of a force radially from said first circumferential sleeve towards said component, the device having an open position and a closed position, said first sleeve, said sealing element and said component being not in tight contact in said open position and said first sleeve, said sealing element and said component being in tight contact in said closed position, said first sealing contact zone being effective in said closed position.

* * * * *